US012381361B2

(12) United States Patent
He et al.

(10) Patent No.: US 12,381,361 B2
(45) Date of Patent: Aug. 5, 2025

(54) ELECTRICAL CONNECTING ASSEMBLY

(71) Applicant: LOTES CO., LTD, Keelung (TW)

(72) Inventors: Zhi Li He, Keelung (TW); Wen Chang Chang, Keelung (TW)

(73) Assignee: LOTES CO., LTD, Keelung (TW)

( * ) Notice: Subject to any disclaimer, the term of this patent is extended or adjusted under 35 U.S.C. 154(b) by 564 days.

(21) Appl. No.: 17/740,423

(22) Filed: May 10, 2022

(65) Prior Publication Data

US 2022/0368084 A1 Nov. 17, 2022

(30) Foreign Application Priority Data

May 12, 2021 (CN) ........................ 202110518239.8
Nov. 8, 2021 (CN) ........................ 202111313724.8

(51) Int. Cl.
*H01R 13/6587* (2011.01)

(52) U.S. Cl.
CPC ................................ *H01R 13/6587* (2013.01)

(58) Field of Classification Search
CPC ........... H01R 13/6587; H01R 13/6585; H01R 13/6586; H01R 13/658; H01R 13/6581; H01R 13/6582; H01R 13/6591; H01R 13/646; H01R 13/6461; H01R 13/648; H01R 12/724; H01R 12/716; H01R 13/40
USPC .... 439/607.07, 607.09, 607.11, 607.1, 541.5
See application file for complete search history.

(56) References Cited

U.S. PATENT DOCUMENTS

| | | | | |
|---|---|---|---|---|
| 7,789,676 B2 | 9/2010 | Morgan et al. | | |
| 8,641,448 B2 | 2/2014 | Lappoehn | | |
| 8,690,604 B2 * | 4/2014 | Davis | H01R 13/6581 | 439/607.07 |
| 11,018,454 B2 | 5/2021 | Laurx et al. | | |
| 11,799,245 B2 * | 10/2023 | Liu | H01R 13/518 | |
| 2016/0072231 A1 * | 3/2016 | Sypolt | H01R 13/6585 | 439/607.08 |

(Continued)

FOREIGN PATENT DOCUMENTS

| | | |
|---|---|---|
| CN | 101958474 B | 7/2014 |
| CN | 103296510 B | 11/2015 |
| CN | 106025735 A | 10/2016 |

(Continued)

*Primary Examiner* — Tulsidas C Patel
*Assistant Examiner* — Jeffrey Mountain
(74) *Attorney, Agent, or Firm* — Troutman Pepper Locke LLP; Tim Tingkang Xia, Esq.

(57) ABSTRACT

An electrical connecting assembly includes an electrical connector including a first terminal assembly, and a mating connector including a second terminal assembly. The first terminal assembly includes a first shielding shell covering outside a pair of first signal terminals. Each first signal terminal has a first contact portion. The second terminal assembly includes a second shielding shell covering outside a pair of second signal terminals. Each second signal terminal has a second contact portion. The first shielding shell is provided with at least one naked spacing region. When mating of the electrical connector and the mating connector is complete, the second shielding shell covers outside the first shielding shell and shields the naked spacing region, the first contact portion and the corresponding second contact portion are mated, and at least one of the first and second contact portions is exposed in the naked spacing region.

20 Claims, 26 Drawing Sheets

(56) References Cited

U.S. PATENT DOCUMENTS

2018/0358751 A1 * 12/2018 Laurx ................ H01R 13/6461

FOREIGN PATENT DOCUMENTS

| | | | | | |
|---|---|---|---|---|---|
| CN | 104737374 | B | | 8/2017 | |
| CN | 109390806 | A | | 2/2019 | |
| CN | 110323632 | A | | 10/2019 | |
| CN | 106104933 | B | | 9/2020 | |
| CN | 108352633 | B | | 12/2020 | |
| CN | 212257798 | U | | 12/2020 | |
| CN | 109659722 | B | | 2/2021 | |
| CN | 110783796 | B | | 3/2021 | |
| CN | 112736524 | A | * | 4/2021 | ............. H01R 13/02 |
| CN | 213753308 | U | | 7/2021 | |
| CN | 113410678 | A | | 9/2021 | |

* cited by examiner

4

ELECTRICAL CONNECTING ASSEMBLY

CROSS-REFERENCE TO RELATED PATENT APPLICATION

This non-provisional application claims priority to and the benefit of, pursuant to 35 U.S.C. § 119(a), patent application Serial No. CN202110518239.8 filed in China on May 12, 2021, and patent application Serial No. CN202111313724.8 filed in China on Nov. 8, 2021. The disclosure of each of the above applications is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention relates to an electrical connecting assembly, and particularly to an electrical connecting assembly preventing signal terminals from short-circuiting and with good high frequency characteristics.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A conventional connector system includes a first connector and a second connector. The first connector includes a pair of first signal terminals and a first shielding shell covering around the first signal terminals, and the second connector includes a pair of second signal terminals and a second shielding shell covering around the second signal terminals. When the mating of the first connector and the second connector is complete, the first contact portions of the first signal terminals and the second contact portions of the second signal terminals are mated, and the first shielding shell is accommodated in the second shielding shell. The first contact portions and the second contact portions abut each other in a first direction and are all located in the first shielding shell.

After the mating of the first connector and the second connector is complete, in the first direction, the first contact portions and the second contact portions may be adjacent to the two inner walls provided opposite to each other in the first direction, thus easily causing the first contact portions and the second contact portions to be in contact with the inner walls of the first shielding shell and generating short-circuiting.

Therefore, a heretofore unaddressed need to design a new electrical connecting assembly exists in the art to address the aforementioned deficiencies and inadequacies.

SUMMARY

In view of the deficiency of the background, the present invention is directed to an electrical connecting assembly, in which at least one of the first contact portion and the second contact portion is exposed in a naked spacing region of the first shielding shell, such that the first contact portion or the second contact portion is not in contact with the first shielding shell in an abutting direction thereof, thus preventing the first contact portion or the second contact portion from being in contact with the first shielding shell and short-circuiting. Meanwhile, the second shielding shell shields the naked spacing region, which further prevents the naked spacing region from causing the first contact portion or the second contact portion being affected by interference signals of the outer environment, and prevents the high frequency characteristics of the electrical connecting assembly from being affected.

To achieve the foregoing objective, the present invention adopts the following technical solutions. An electrical connecting assembly includes: an electrical connector, including at least one first terminal assembly, wherein the first terminal assembly includes: a pair of first signal terminals and a first shielding shell covering outside the pair of first signal terminals, the first shielding shell and the first signal terminals are electrically separated, and each of the first signal terminals has a first contact portion; and a mating connector, including at least one second terminal assembly, wherein the second terminal assembly includes: a pair of second signal terminals and a second shielding shell covering outside the pair of second signal terminals, the second shielding shell and the second signal terminals are electrically separated, and each of the second signal terminals has a second contact portion; wherein the first shielding shell is provided with at least one naked spacing region, and when mating of the electrical connector and the mating connector is complete, the second shielding shell covers outside the first shielding shell and shields the at least one naked spacing region, the first contact portion of each of the first signal terminals and the second contact portion of a corresponding one of the second signal terminals are mated, and at least one of the first contact portion of each of the first signal terminals and the second contact portion of each of the second signal terminals is exposed in the at least one naked spacing region.

In certain embodiments, a tail end of at least one of the first contact portion of each of the first signal terminals and the second contact portion of each of the second signal terminals has a guiding section bending and extending, and the guiding section is exposed in the at least one naked spacing region.

In certain embodiments, each of the first contact portion of each of the first signal terminals and the second contact portion of each of the second signal terminals has a first contact section and a second contact section, the second contact section of the first contact portion is located adjacent to a tail end of the first contact portion relative to the first contact section of the first contact portion, the second contact section of the second contact portion is located adjacent to a tail end of the second contact portion relative to the first contact section of the second contact portion, each of the first contact portion and the second contact portion has a guiding section formed by bending and extending from the second contact section thereof, and the guiding section of the first contact portion passes forward beyond the first shielding shell, wherein when mating of the electrical connector and the mating connector is complete, the second contact section of the second contact portion of the corresponding one of the second signal terminals is in contact with the first contact section of the first contact portion of each of the first signal terminals, and the guiding section of the second contact portion is exposed in the at least one naked spacing region and shielded by the second shielding shell.

In certain embodiments, the first shielding shell has two first side surfaces provided oppositely, the second shielding shell has two second side surfaces provided oppositely, each of the second side surfaces is provided with an opening, an elastic sheet is formed by integrally extending from an inner edge of the opening of each of the second side surfaces, and when mating of the electrical connector and the mating connector is complete, the elastic sheet corresponding to each of the second side surfaces abuts a corresponding one of the first side surfaces, and each of the first side surfaces shields the opening of a corresponding one of the second side surfaces.

In certain embodiments, the first shielding shell further comprises at least one main body surface, each of two sides of the main body surface is connected to a corresponding one of the first side surfaces through a curved transitional surface, the at least one naked spacing region is formed by being backward concavely provided from a front end of the main body surface, each of the first side surface is provided with a recess in communication with the at least one naked spacing region, the recess is provided between the corresponding one of the first side surfaces and the curved transitional surface on a same side of the two sides, a front end of each of the first side surfaces extends in a direction toward the at least one naked spacing region beyond a connecting location of the curved transitional surface and the corresponding one of the first side surfaces, and the front end of each of the first side surfaces shields the opening of the corresponding one of the second side surfaces.

In certain embodiments, each of the first signal terminals has a first conductive portion and a first connecting portion connecting the first contact portion and the first conductive portion, and the first contact portion extends forward from the first connecting portion and bends toward a direction away from the second contact portion.

In certain embodiments, each of the second signal terminals has a second conductive portion and a second connecting portion connecting the second contact portion and the second conductive portion, and the second contact portion extends toward an extending direction of each of the second signal terminals and bends toward a direction away from the first contact portion.

In certain embodiments, each of the first contact portion of each of the first signal terminals and the second contact portion of each of the second signal terminals has a first bending section, a first contact section, a second bending section and a second contact section formed by sequentially extending along respective extending directions, the first bending section and the second bending section of the first contact portion both bend toward the direction away from the second contact portion, and the first bending section and the second bending section of the second contact portion both bend toward the direction away from the first contact portion; and when mating of the electrical connector and the mating connector is complete, the second contact section of the first contact portion of each of the first signal terminals is in contact with the first contact section of the second contact portion of the corresponding one of the second signal terminals, and the second contact section of the second contact portion of the corresponding one of the second signal terminals is in contact with the first contact section of the first contact portion of each of the first signal terminals.

In certain embodiments, the first terminal assembly further has a first insulating block insulating and separating the first signal terminals from the first shielding shell, the first insulating block has at least one first supporting portion extending forward beyond the first bending section of the first contact portion, and the at least one first supporting portion is located at an opposite side of a contact surface of the first contact section of the first contact portion of each of the first signal terminals and supports the first contact portion of each of the first signal terminals; and the second terminal assembly further has a second insulating block insulating and separating the second signal terminals from the second shielding shell, the second insulating block has at least one second supporting portion extending toward the electrical connector beyond the first bending section of the second contact portion, and the at least one second supporting portion is located at an opposite side of a contact surface of the first contact section of the second contact portion of each of the second signal terminals and supports the second contact portion of each of the second signal terminals.

In certain embodiments, the first shielding shell comprises two U-shaped shielding bodies, the two U-shaped shielding bodies are assembled to each other to form a tube-shaped structure, the at least one naked spacing region is formed on one of the two U-shaped shielding bodies, the second shielding shell is formed in a tube-shaped structure, and when mating of the electrical connector and the mating connector is complete, the first shielding shell and the second shielding shell are mated to each other to completely cover the first contact portion of each of the first signal terminals and the second contact portion of each of the second signal terminals.

In certain embodiments, the first contact portion of each of the first signal terminals is exposed in the at least one naked spacing region, and the first shielding shell is further provided with a reserved slot provided opposite to the at least one naked spacing region; and the second terminal assembly further has an insulating block insulating and separating the second signal terminals from the second shielding shell, the insulating block has at least one supporting portion, and when mating of the electrical connector and the mating connector is complete, the at least one supporting portion supports the second contact portion of each of the second signal terminals toward the first contact portion of a corresponding one of the first signal terminals, and the reserved slot is reserved for the supporting portion.

In certain embodiments, the electrical connector comprises at least one insulating body and a plurality of first terminal assemblies, the insulating body is provided with a plurality of accommodating slots concavely provided from two opposite sides of the insulating body, and each of the plurality of first terminal assemblies is accommodated in a corresponding one of the accommodating slots.

In certain embodiments, the electrical connector comprises two rows of first terminal assemblies, each row of the two rows of the first terminal assemblies comprises a plurality of the first terminal assemblies arranged along a vertical direction, the two rows of the first terminal assemblies are provided to be adjacent to each other along a left-right direction perpendicular to the vertical direction and to deviate from each other along the vertical direction, and in the two rows of the first terminal assemblies provided to be adjacent to each other, projections of the first signal terminals of one row of the two rows of the first terminal assemblies and projections of the first signal terminals of the other row of the two rows of the first terminal assemblies along the left-right direction are completely staggered.

Compared with the related art, the electrical connecting assembly according to certain embodiments of the present invention has the following beneficial effects. The first contact portion is exposed in the at least one naked spacing region, or the second contact portion is exposed in the at least one naked spacing region, or the first contact portion and the second contact portion are both exposed in the at least one naked spacing region, such that the first contact portion or the second contact portion is not in contact with the first shielding shell in an abutting direction thereof, thus preventing the first contact portion or the second contact portion from being in contact with the first shielding shell and short-circuiting. Meanwhile, the second shielding shell shields the at least one naked spacing region, which further prevents the at least one naked spacing region from causing the first contact portion or the second contact portion being affected by interference signals of the outer environment. Moreover, the first shielding shell covers the outer side of the first signal terminals, thus shielding the interference signals from the first signal terminals, and enhancing the high frequency characteristics of the electrical connector. The second shielding shell covers the outer side of the second signal terminals, thus shielding the interference signals from the second signal terminals, and enhancing the high frequency characteristics of the mating connector. Further, when mating of the electrical connector and the mating connector is complete, the second shielding shell covers outside the first shielding shell and shields the at least one naked spacing region, thereby allowing the first shielding shell and the second shielding shell to altogether shield the interference signals from the electrical connecting assembly, thus enhancing the high frequency characteristics of the electrical connecting assembly.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

Figure 1:
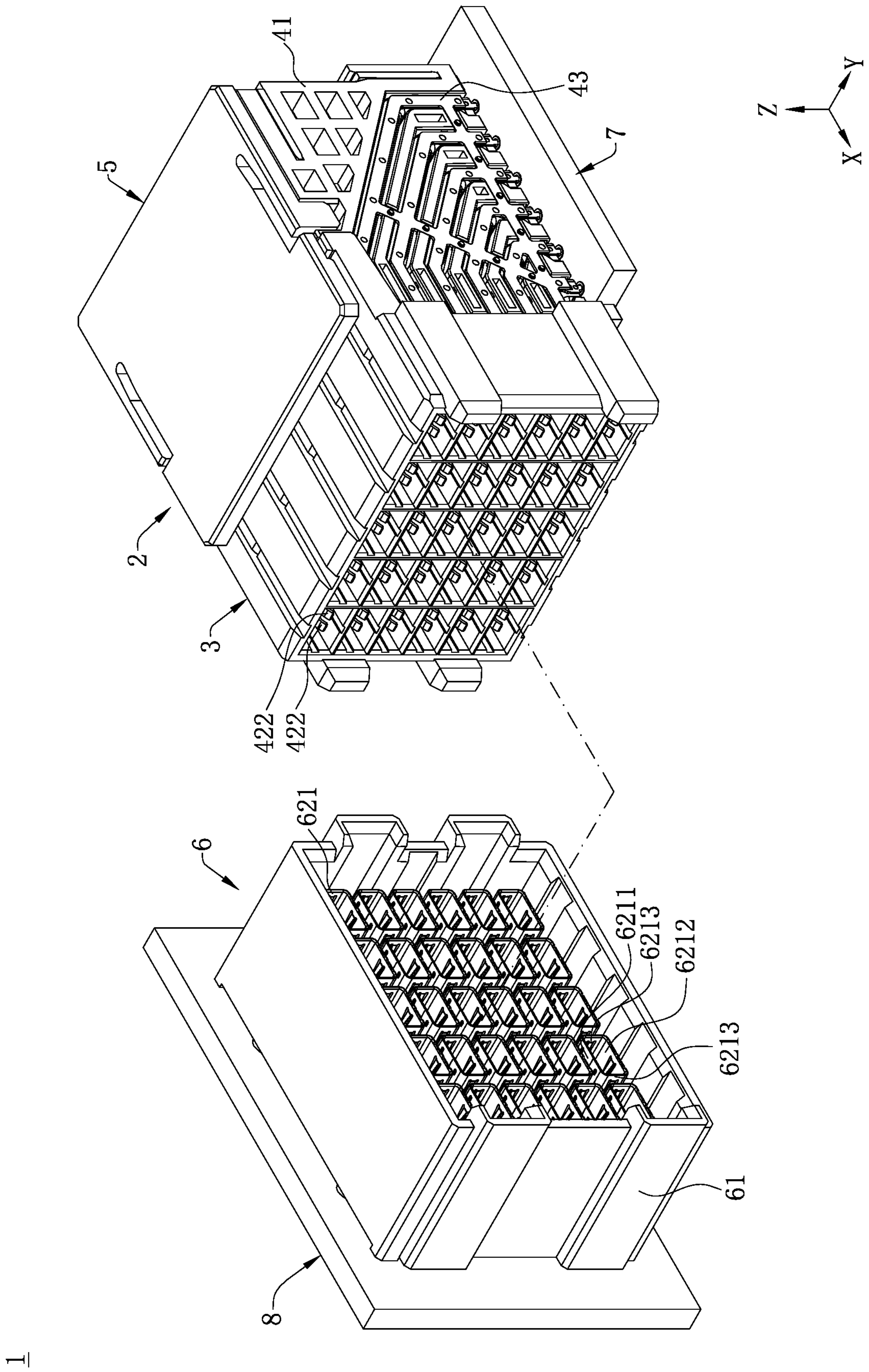
FIG. 1 is a perspective schematic view of an electrical connector and a mating connector of an electrical connector assembly prior to mating according to a first embodiment of the present invention.
Figure 2:
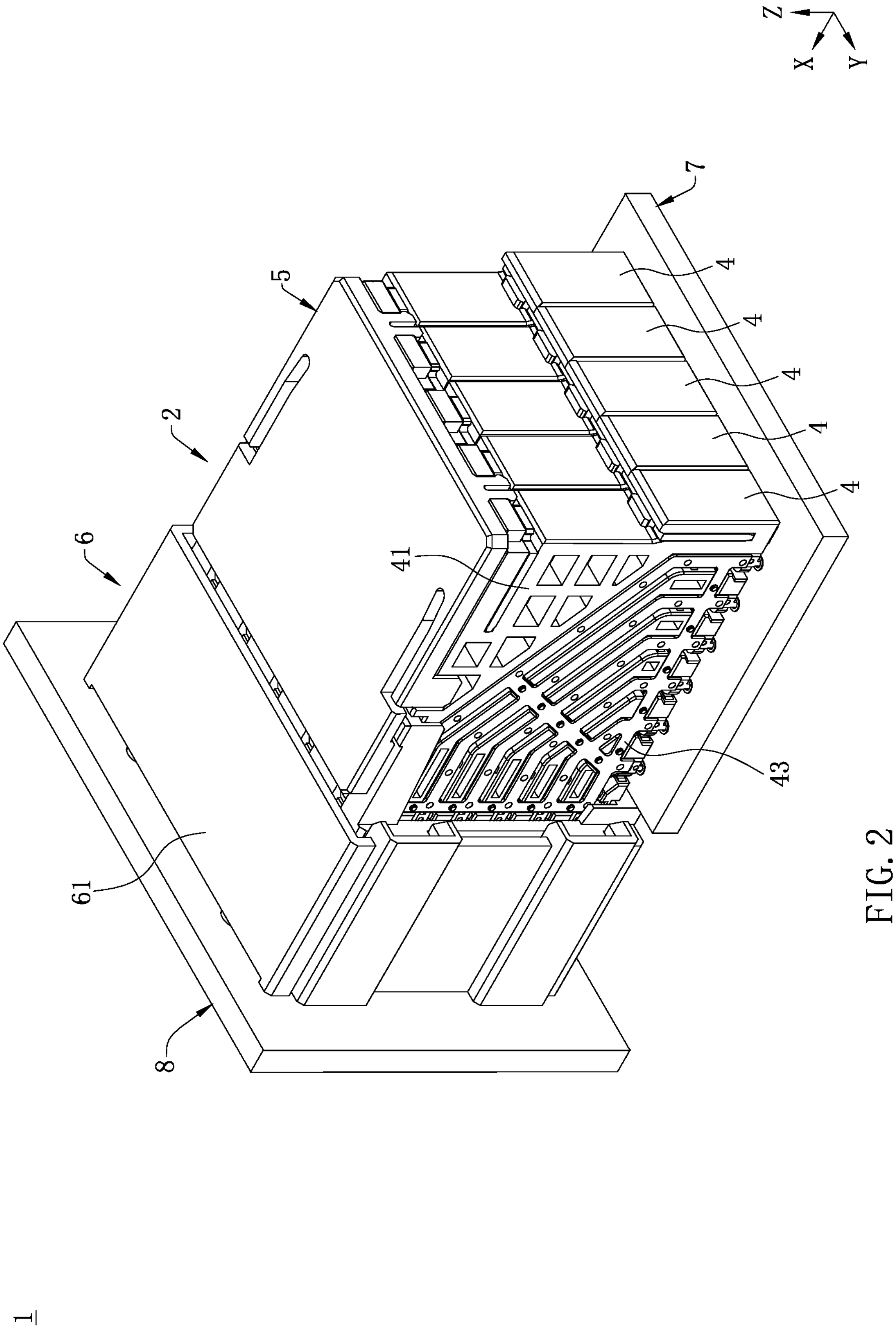
FIG. 2 is a perspective schematic view of the electrical connector and the mating connector of the electrical connector assembly after completion of mating according to the first embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising", "including", "carrying", "having", "containing", "involving", and the like are to be understood to be open-ended, i.e., to mean including but not limited to.

The description will be made as to the embodiments of the present invention in conjunction with the accompanying drawings in FIGS. 1-23. In accordance with the purposes of this invention, as embodied and broadly described herein, this invention, in one aspect, relates to an electrical connecting assembly.

For convenience of understanding the technical solutions of the present invention, in the three-dimensional coordinate as shown in the accompanied drawings of the first to third embodiments, the X-axis is defined as a front-rear direction, the Y-axis is defined as a left-right direction, and the Z-axis is defined as a vertical direction. Any two of the X-axis, the Y-axis and the Z-axis are perpendicular to each other.

FIG. 1 to FIG. 4 show an electrical connecting assembly 1 according to a first embodiment of the present invention, which includes an electrical connector 2 and a mating connector 6 mated with the electrical connector 2. A front end of the electrical connector 2 is mated with one end of the mating connector 6 along the front-rear direction X, and a bottom end of the electrical connector 2 is electrically connected to a first base plate 7 along the vertical direction Z. Another end of the mating connector 6 is electrically connected to a second base plate 8.

Figure 3:
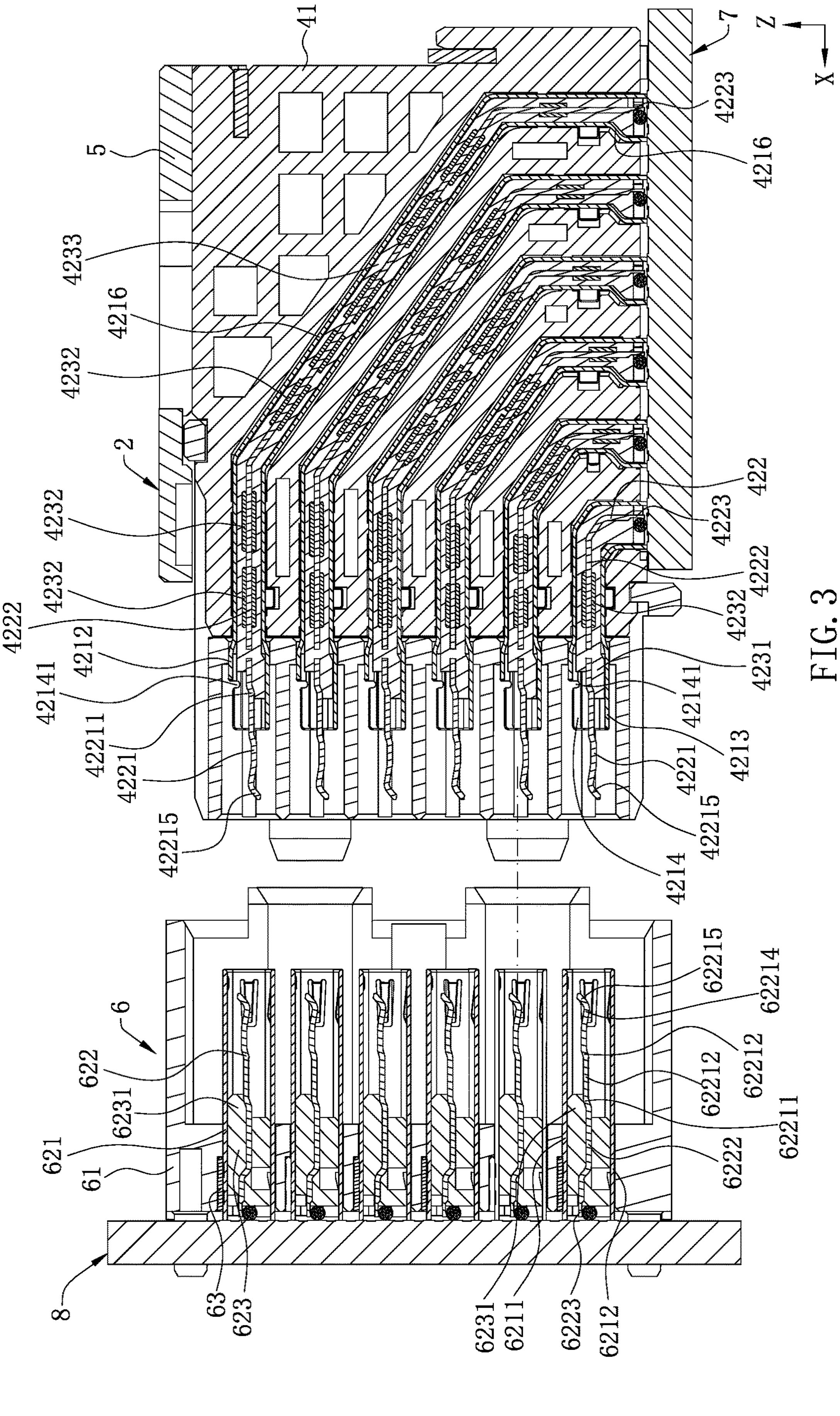
FIG. 3 is a sectional view of the electrical connector and the mating connector of the electrical connector assembly prior to mating according to the first embodiment of the present invention.
Figure 6:
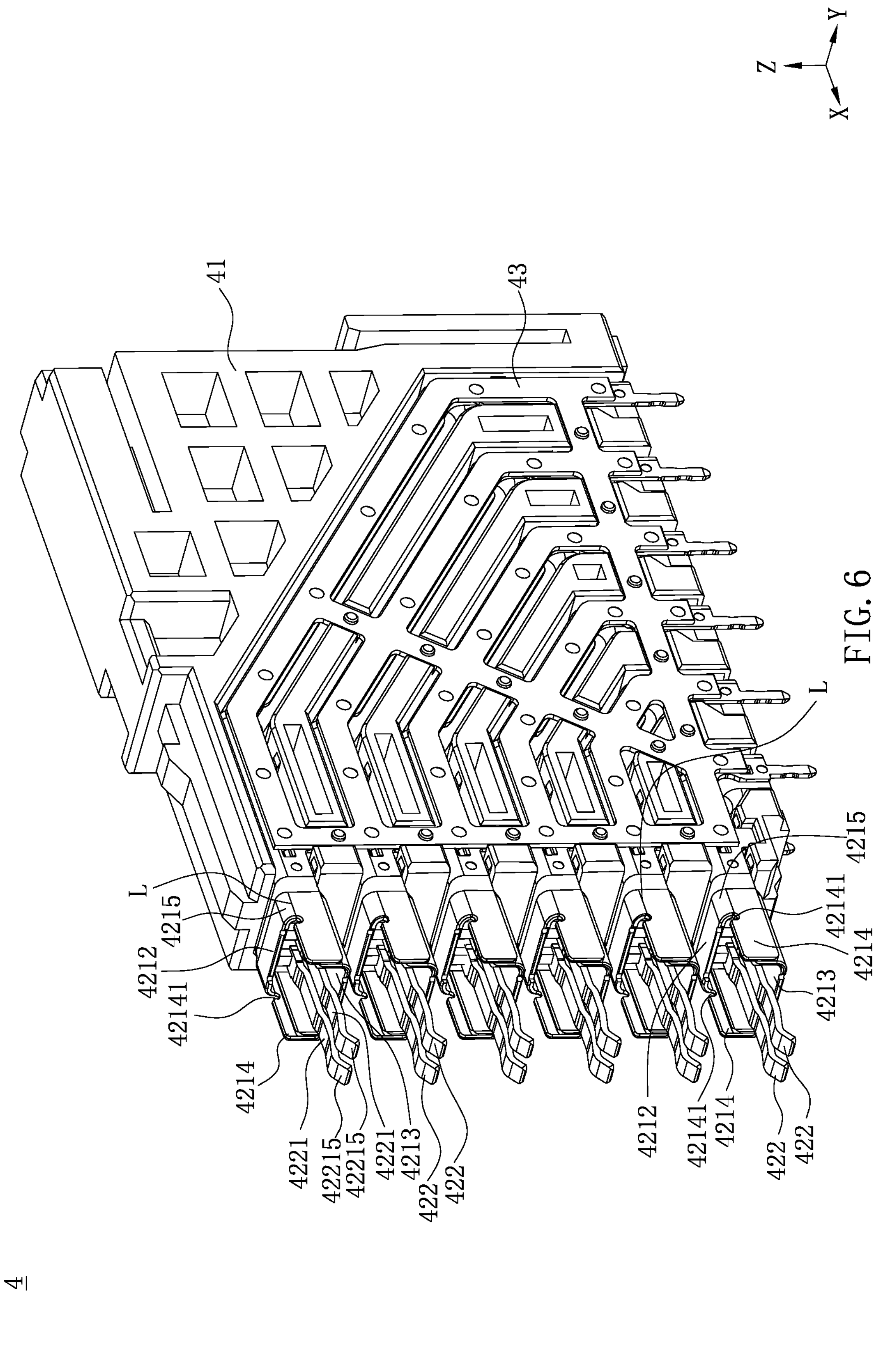
FIG. 6 is a perspective view of an electrical module according to the first embodiment of the present invention.

Referring to FIG. 1, FIG. 3 and FIG. 6, the electrical connector 2 according to the first embodiment of the present invention includes a first insulating mating shell 3 mated with the mating connector 6 and a plurality of electrical modules 4. The first insulating mating shell 3 has an accommodating cavity (not shown). The electrical modules 4 are arranged sequentially in parallel along the left-right direction Y and are accommodated in the accommodating cavity along the front-rear direction X. Each electrical module 4 includes an insulating body 41, a plurality of first terminal assemblies 42 arranged on the insulating body 41 along the vertical direction Z, and a shielding member 43 adjacent to one side of the insulating body 41. The insulating body 41 is provided with a plurality of accommodating slots 411 arranged along the vertical direction Z. Each accommodating slot 411 correspondingly accommodates one of the first terminal assemblies 42.

Each first terminal assembly 42 includes a pair of first signal terminals 422 and a first shielding shell 421 covering outside of the pair of first signal terminals 422. The first shielding shell 421 and the first signal terminals 422 are electrically isolated. Specifically, each first terminal assembly 42 further includes a first insulating block 423 covering the pair of first signal terminals 422, and the first insulating block 423 insulates and isolates the first signal terminals 422 from the first shielding shell 421. Each first signal terminal 422 has a first contact portion 4221, a first conducting portion 4223 and a first connecting portion 4222 connecting the first contact portion 4221 and the first conducting portion 4223. In this embodiment, the first insulating block 423 covers the first connecting portion 4222. The first conducting portion 4223 extends in the vertical direction Z. The first connecting portion 4222 bends and extends in the front-rear direction X and the vertical direction Z. The first contact portion 4221 extends forward from the first connecting portion 4222. That is, the extending direction of the first contact portion 4221 is forward.

Figure 9:
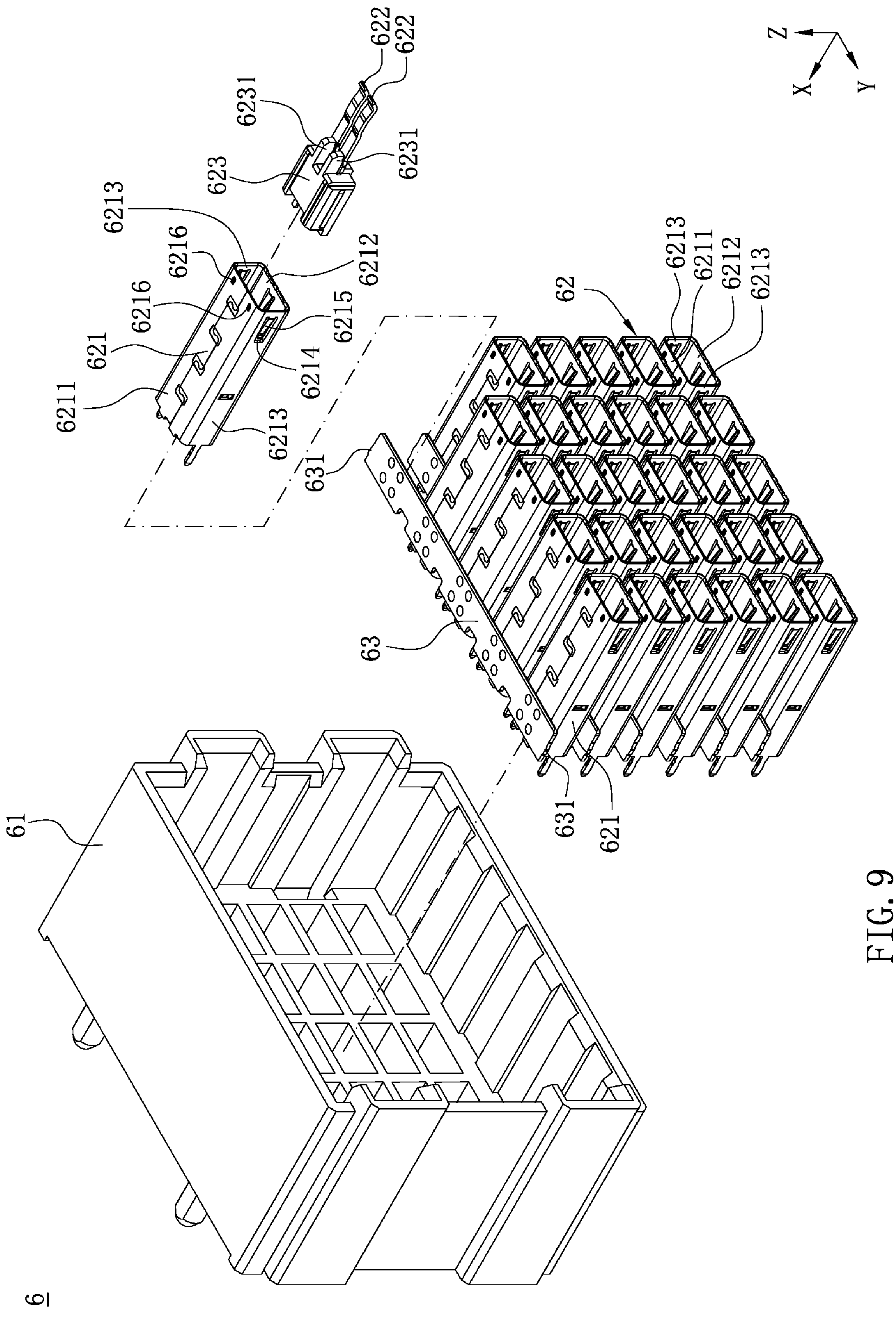
FIG. 9 is a disassembled view of the mating connector according to the first embodiment of the present invention.
Figure 10A:
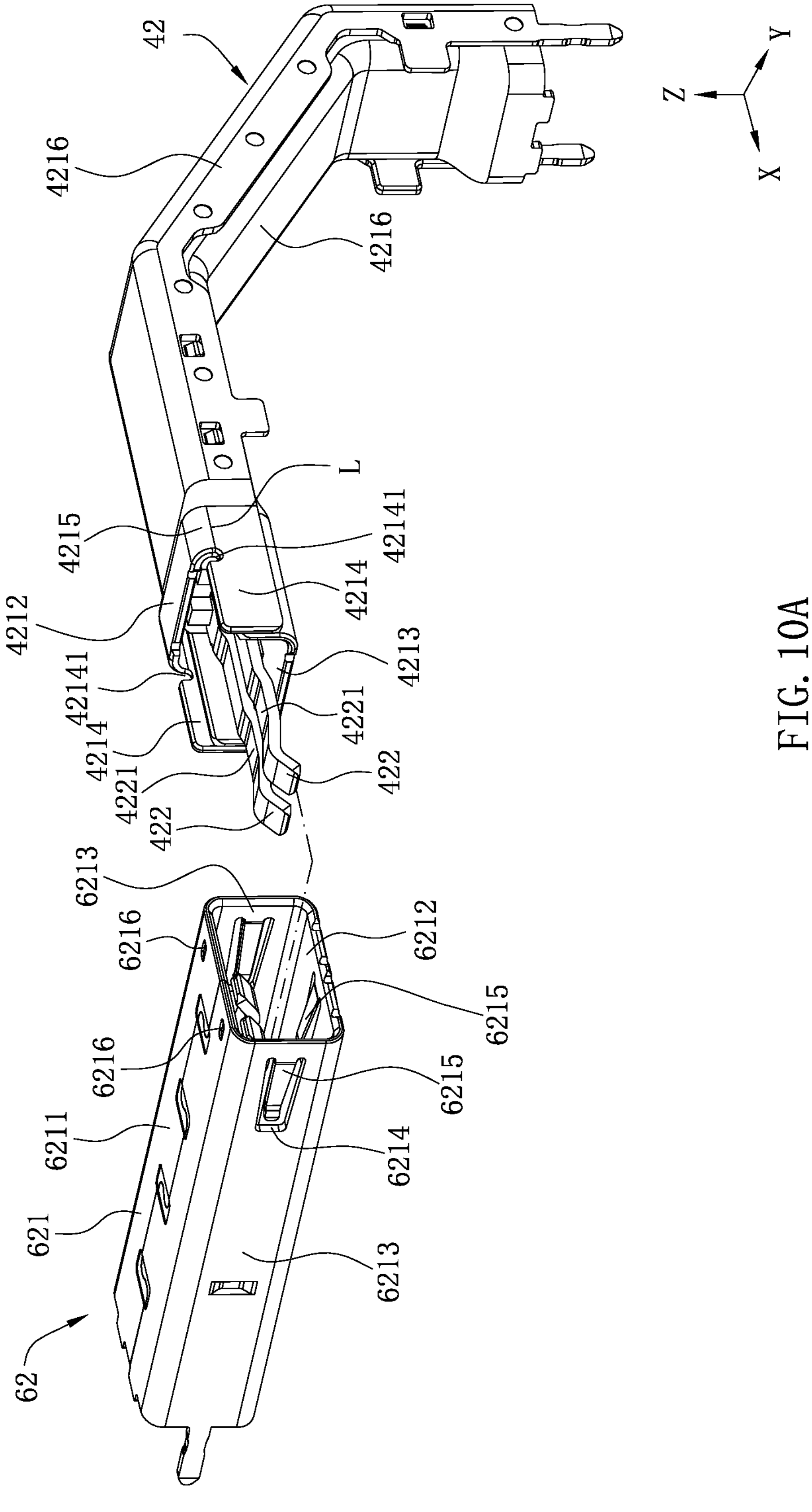
FIG. 10A is a perspective view of a first terminal assembly and a second terminal assembly prior to mating according to the first embodiment of the present invention.
Figure 10B:
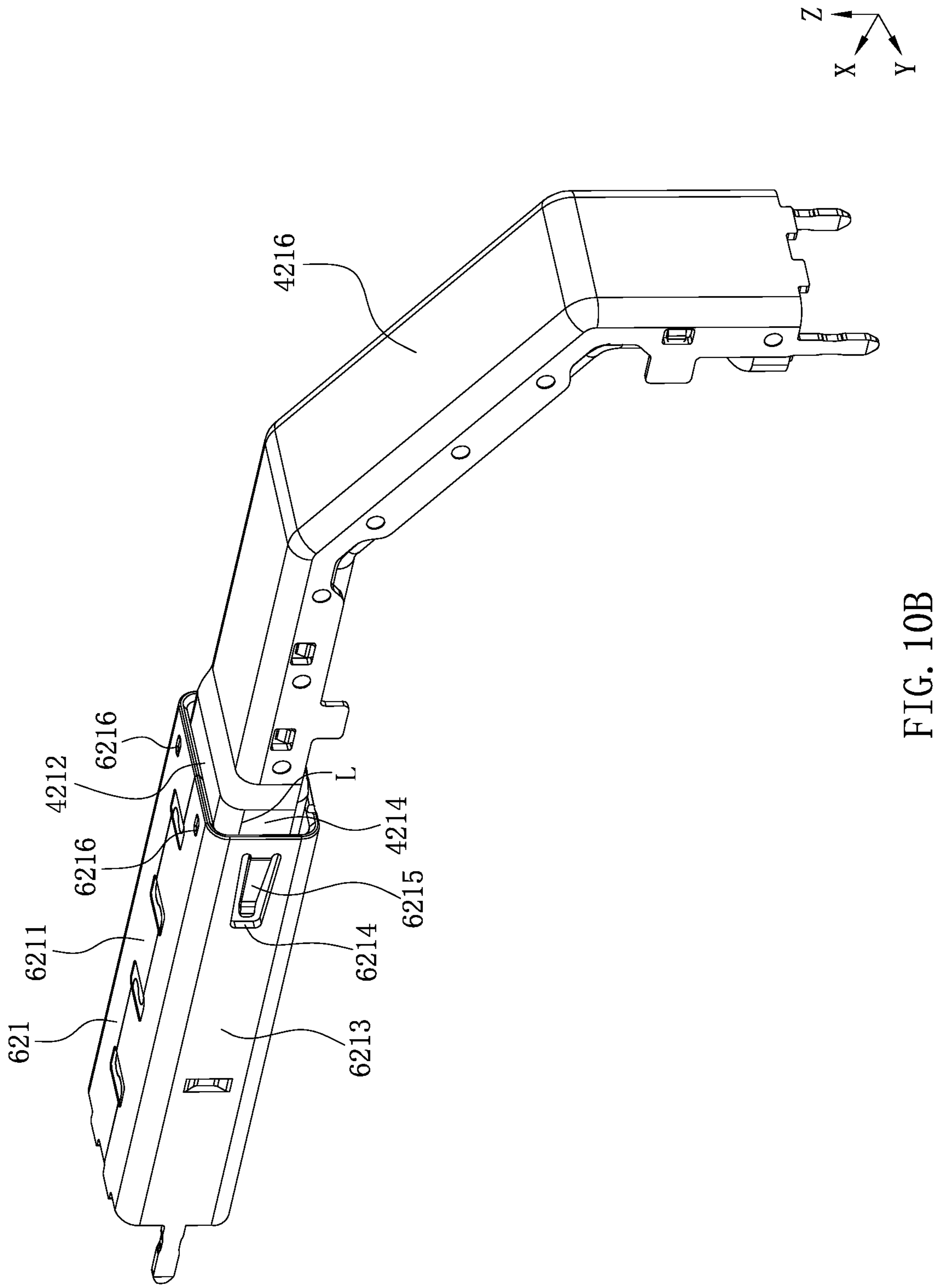
FIG. 10B is a perspective view of a first terminal assembly and a second terminal assembly after completion of mating according to the first embodiment of the present invention.

Referring to FIG. 1, FIG. 3 and FIG. 9, the mating connector 6 according to the first embodiment of the present invention includes a second insulating mating shell 61, a plurality of grounding bars 63, and a plurality of second terminal assemblies 62 fixed to the second insulating mating shell 61. Each second terminal assembly 62 includes a pair of second signal terminals 622, and a second shielding shell 621 covering outside the pair of second signal terminals 622. The second shielding shell 621 and the second signal terminals 622 are electrically isolated. Specifically, each second terminal assembly 62 further includes a second insulating block 623 covering the pair of second signal terminals 622, and the second insulating block 623 insulates and isolates the second signal terminals 622 from the second shielding shell 621. Each second signal terminal 622 has a second contact portion 6221, a second conducting portion 6223 and a second connecting portion 6222 connecting the second contact portion 6221 and the second conducting portion 6223. In this embodiment, the second insulating block 623 covers the second connecting portion 6222. When the mating of the electrical connector 2 and the mating connector 6 is complete, with reference to the direction of the electrical connector 2, the extending directions of the second conducting portion 6223, the second connecting portion 62222 and the second contact portion 6221 are all backward. That is, the extending direction of the second contact portion 6221 is backward.

The second terminal assemblies 62 are arranged in a plurality of columns along the vertical direction Z. In each column, the second terminal assemblies 62 are arranged along the left-right direction Y. Each grounding bar 63 extends along the left-right direction Y. The second shielding shells 621 in each column are simultaneously in contact with a corresponding grounding bar 63, such that the second shielding shells 621 in the same column have a same electrical potential, thus enhancing the high frequency characteristics of the mating connector 6. Each grounding bar 63 is provided with two interfering portions 631 protruding outward at two ends thereof in the left-right direction Y, and each grounding bar 63 is fixed with interference to the second insulating mating shell 61 by the two interfering portions 631.

Referring to FIG. 5 to FIG. 8, in the first embodiment of the present invention, the first shielding shell 421 is provided with a naked spacing region 4211. When the mating of the electrical connector 2 and the mating connector 6 is complete, each first terminal assembly 42 and a corresponding second terminal assembly 62 are mated with each other, the first contact portion 4221 and the second contact portion 6221 are mated with each other, the second contact portion 6221 is exposed out of the naked spacing region 4211 of the first shielding shell 421, and the second shielding shell 621 covers outside the first shielding shell 421 and shields the naked spacing region 4211. It should be noted that, the second shielding shell 621 shielding the naked spacing region 4211 indicates that the second shielding shell 621 shields the naked spacing region 4211, such that the naked spacing region 4211 has no gap in communication with the outer environment. Thus, in the first embodiment of the present invention, the second contact portion 6221 is exposed in the naked spacing region 4211, such that the second contact portion 6221 is not in upward contact with the first shielding shell 421, thus preventing the second contact portion 6221 from being in contact with the first shielding shell 421 and short-circuiting. Meanwhile, the second shielding shell 621 shields the naked spacing region 4211, which further prevents the naked spacing region 4211 from causing the second contact portion 6221 being affected by interference signals of the outer environment. Moreover, the first shielding shell 421 covers the outer side of the first signal terminals 422, thus shielding the interference signals from the first signal terminals 422, and enhancing the high frequency characteristics of the electrical connector 2. The second shielding shell 621 covers the outer side of the second signal terminals 622, thus shielding the interference signals from the second signal terminals 622, and enhancing the high frequency characteristics of the mating connector 6. Further, when mating of the electrical connector 2 and the mating connector 6 is complete, the second shielding shell 621 covers outside the first shielding shell 421 and shields the naked spacing region 4211, thereby allowing the first shielding shell 421 and the second shielding shell 621 to altogether shield the interference signals from the electrical connecting assembly 1, thus enhancing the high frequency characteristics of the electrical connecting assembly 1.

It should be noted that the second shielding shell 621 covers the naked spacing region 4211, and in the first embodiment of the present invention, the second shielding shell 621 as a tube-shaped structure covers outside the first shielding shell 421 and covers the naked spacing region 4211. In other embodiments, the second shielding shell 621 may extend a sheet-shaped extending portion (not shown) to shield the naked spacing region 4211, which is not hereinafter limited thereto. In the first embodiment, when the mating of the electrical connector 2 and the mating connector 6 is complete, the second contact portion 6221 is located above the first contact portion 4221, and correspondingly, the naked spacing region 4211 is located on a first main body surface 4212 of the first shielding shell 421. In other embodiments, when the mating of the electrical connector 2 and the mating connector 6 is complete, the second contact portion 6221 may be located below the first contact portion 4221, and correspondingly, the naked spacing region 4211 is located on a second main body surface 4213 of the first shielding shell 421, thus facilitating exposing the second contact portion 6221 to the naked spacing region 4211, which is not hereinafter limited thereto.

Figure 4:
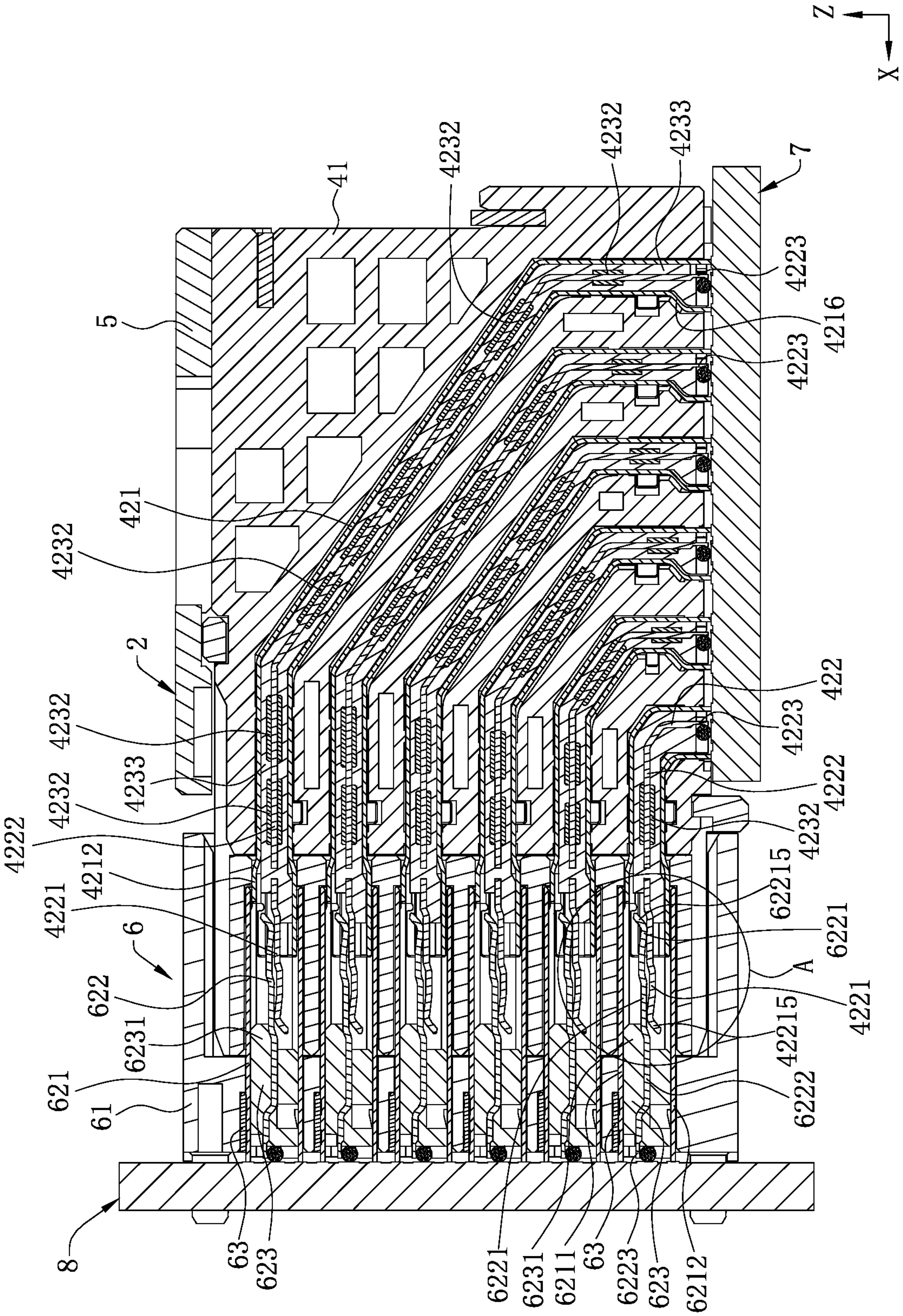
FIG. 4 is a sectional view of the electrical connector and the mating connector of the electrical connector assembly after completion of mating according to the first embodiment of the present invention.
Figure 5:
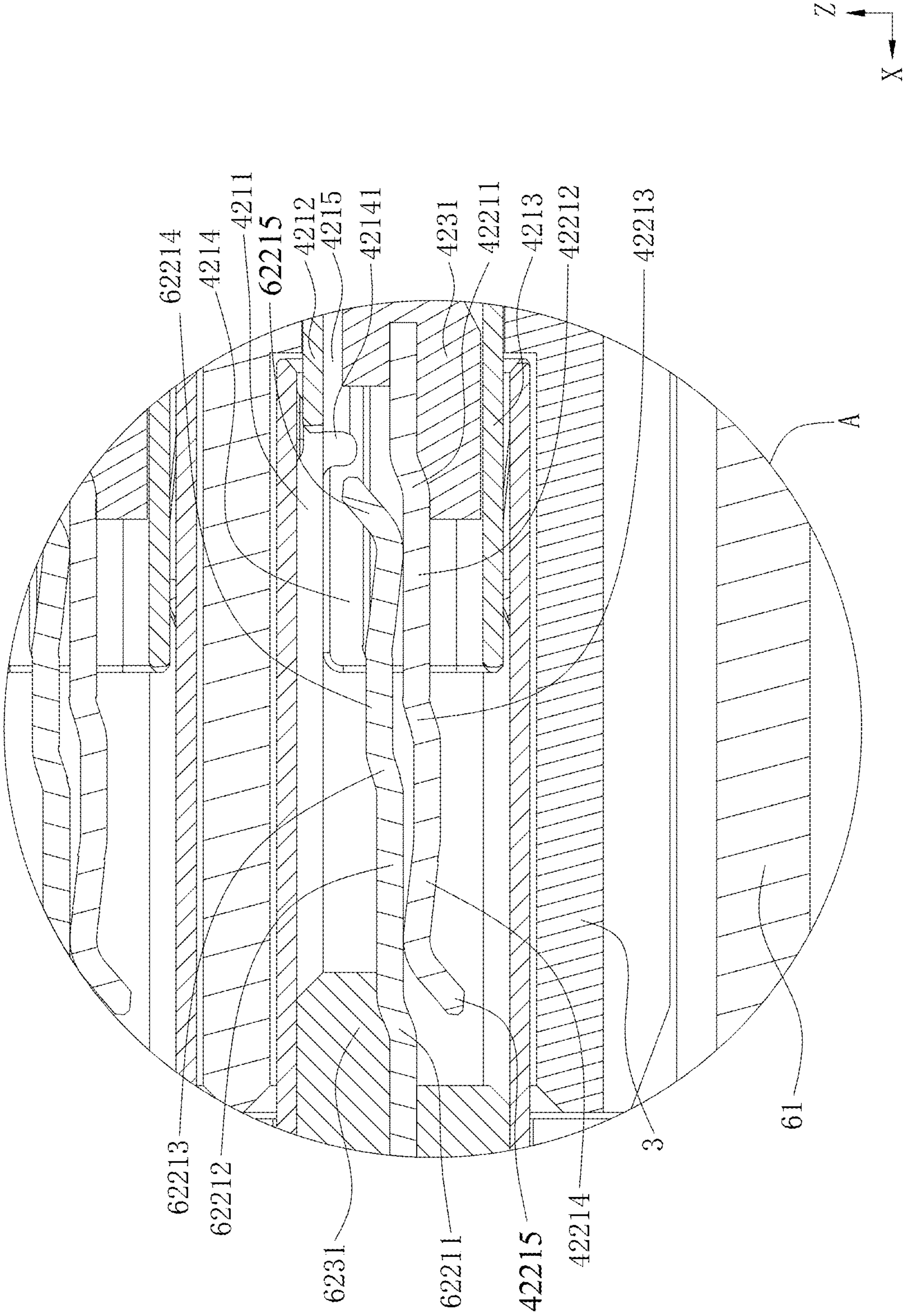
FIG. 5 is an enlarged view of a portion A in FIG. 4.

Referring to FIG. 4 and FIG. 5, in the first embodiment, the first contact portion 4221 has a first bending section 42211, a first contact section 42212, a second bending section 42213, a second contact section 42214 and a guide section formed by sequentially extending along the extending direction of the first contact portion 4221 (that is, sequentially extending forward). The second contact portion 6221 has a first bending section 62211, a first contact section 62212, a second bending section 62213, a second contact section 62214 and a guide section formed by sequentially extending along the extending direction of the second contact portion 6221 (that is, sequentially extending backward). The second contact section 42214 of the first contact portion 4221 is located closer to the tail end of the first contact portion 4221 relative to the first contact section 42212 of the first contact portion 4221, and the second contact section 62214 of the second contact portion 6221 is located closer to the tail end of the second contact portion 6221 relative to the first contact section 62212 of the second contact portion 6221. The guiding section of the first contact portion 4221 functions as a first guiding section 42215, and the guiding section of the second contact portion 6221 functions as a second guiding section 62215. The first guiding section 42215 bends and extends from the second contact section 42214 of the first contact portion 4221, and the second guiding section 62215 bends and extends from the second contact section 62214 of the second contact portion 6221. In this embodiment, the second guiding section 62215 is exposed in the naked spacing region 4211 of the first shielding shell 421, and the second shielding shell 621 shields the naked spacing region 4211. Thus, in the mating process, by the guiding functions of the first guiding section 42215 and the second guiding section 62215, the first signal terminal 422 and the second signal terminal 622 are smoothly mated. Since the first guiding section 42215 bends and extends toward the first main body surface 4212 of the first shielding shell 421, and the second guiding section 62215 bends and extends toward the second main body surface 4213 of the first shielding shell 421, if there is no naked spacing region provided, the first guiding section 42215 and the second guiding section 62215 may be more easily in contact with the first shielding shell 421. Moreover, according to the first embodiment of present invention, the second guiding section 62215 is exposed in the naked spacing region 4211, which may prevent the second guiding section 62215 from being in contact with the first shielding shell 421 and causing short-circuiting of the second signal terminal 622. Meanwhile, compared to the case where the first shielding shell 421 is not provided with the naked spacing region 4211, in the first embodiment of the present invention, since the second guiding section 62215 is exposed in the naked spacing region 4211, on the premise that the second guiding section 62215 is not in contact with the second shielding shell 621, the length design range of the second guiding section 62215 is broader, thus facilitating increasing the length of the second guiding section 62215 according to the actual need, and enlarging the designable range of the length of the second guiding section 62215. It should be noted that, in the first embodiment of the present invention, the second guiding section 62215 is exposed in the naked spacing region 4211, and the second shielding shell 621 shields the naked spacing region 4211. In other embodiments, the first guiding section 42215 may be exposed in the naked spacing region 4211, or the first shielding shell 421 has two naked spacing regions 4211 and the first guiding section 42215 and the second guiding section 62215 are both exposed in the corresponding naked spacing regions 4211 of the first shielding shell 421, such that on the premise that the first signal terminal 422 and the second signal terminal 622 may be smoothly mated, the first signal terminal 422 or the second signal terminal 622 may be prevented from being in contact with the first shielding shell 421, thus preventing the first signal terminal 422 or the second signal terminal 622 from short-circuiting, facilitating increasing the length of the first guiding section 42215 or the second guiding section 62215 according to the actual need, and enlarging the designable ranges of the lengths of the first guiding section 42215 and the second guiding section 62215.

Further, the first contact portion 4221 extends forward from the first connecting portion 4222 and bends toward a direction away from the second contact portion 6221, such that when the second contact portion 6221 is in contact with a surface of the first contact portion 4221, the second contact portion 6221 may be further away from the first shielding shell 421 and the second shielding shell 621, further preventing the second contact portion 6221 from being in contact with the first shielding shell 421 and the second shielding shell 621, and effectively preventing the second signal terminal 622 from short-circuiting. For example, in this embodiment, the distance between the top of the second contact portion 6221 and the first shielding shell 421 as well as the second shielding shell 621 is further increased, thus preventing the second contact portion 6221 to be in upward contact with the first shielding shell 421 or the second shielding shell 621. The second contact portion 6221 extends from the second connecting portion 6222 toward the extending direction of the second signal terminal 622 and bends toward the direction away from the first contact portion 4221, such that when the first contact portion 4221 is in contact with a surface of the second contact portion 6221, the first contact portion 4221 may be further away from the first shielding shell 421 and the second shielding shell 621, further preventing the first contact portion 4221 from being in contact with the first shielding shell 421 and the second shielding shell 621, and effectively preventing the first signal terminal 422 from short-circuiting. For example, in this embodiment, the distance between the bottom of the first contact portion 4221 and the first shielding shell 421 as well as the second shielding shell 621 is further increased, thus preventing the first contact portion 4221 to be in downward contact with the first shielding shell 421 or the second shielding shell 621.

Referring to FIG. 3 to FIG. 5, in the first embodiment, the first bending section 42211 and the second bending section 42213 of the first contact portion 4221 both bend toward the direction away from the second contact portion 6221, and the first bending section 62211 and the second bending section 62213 of the second contact portion 6221 both bend toward the direction away from the first contact portion 4221. When mating of the electrical connector 2 and the mating connector 6 is complete, the second contact section 42214 of the first contact portion 4221 is in contact with the first contact section 62212 of the second contact portion 6221, and the second contact section 62214 of the second contact portion 6221 is in contact with the first contact section 42212 of the first contact portion 4221. Thus, the first contact portion 4221 bends twice toward the direction away from the second contact portion 6221, and the second contact portion 6221 bends twice toward the direction away from the first contact portion 6221, thus reserving spaces for each other, preventing the first contact portion 4221 and the second contact portion 6221 from colliding with each other in the mating process, facilitating two-point contact, and reducing open stub effect.

Figure 8:
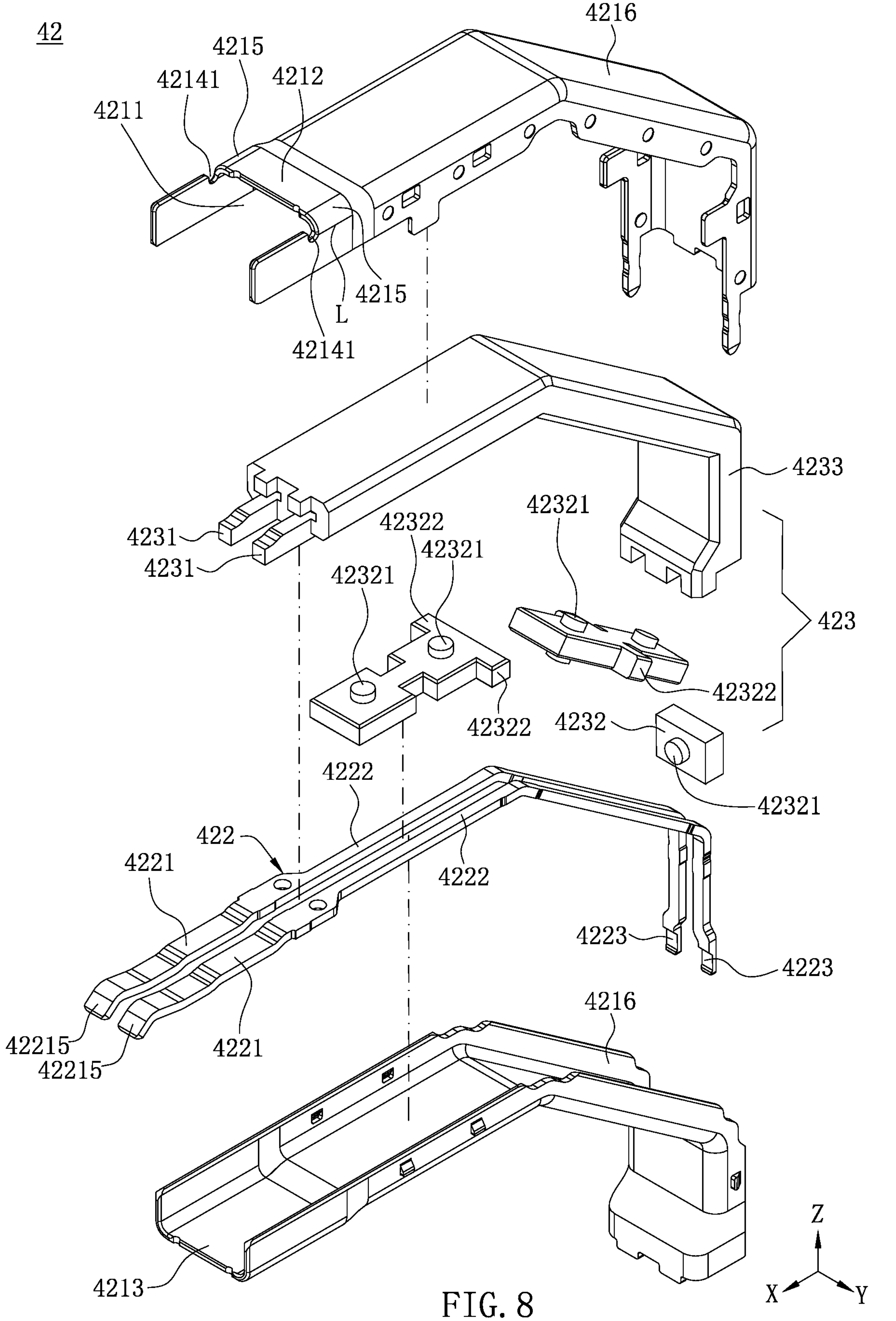
FIG. 8 is a disassembled view of a first terminal assembly according to the first embodiment of the present invention.

Referring to FIG. 5, FIG. 8 to FIG. 9, in the first embodiment, the first insulating block 423 has two first supporting portions 4231. Each first supporting portion 4231 extends forward beyond the first bending section 42211 of the first contact portion 4221, and each first supporting portion 4231 is located at an opposite side to the contact surface of the first contact section 42212 and supports the first contact portion 4221. The second insulating block 623 has two second supporting portions 6231. Each second supporting portion 6231 extends toward the electrical connector 2 and passes beyond the first bending section 62211 of the second contact portion 6221, and each second supporting portion 6231 is located at an opposite side to the contact surface of the first contact section 62212 and supports the second contact portion 6221. Thus, the first contact portion 4221 may be supported by the first supporting portions 4231, and the second contact portion 6221 may be supported by the second supporting portions 6231, thus increasing the strengths of the first contact portion 4221 and the second contact portion 6221, limiting the degree of elastic deformations of the first contact portion 4221 and the second contact portion 6221, preventing them from being over-pressed by each other and being in contact with the first shielding shell 421, and further preventing the first contact portion 4221 and the second contact portion 6221 from short-circuiting. In this embodiment, the second contact portion 6221 is located above the first contact portion 4221, the first supporting portions 4231 upward support a lower surface of the first contact portion 4221, and the second supporting portions 6231 downward support an upper surface of the second contact portion 6221. In other embodiments, the second contact portion 6221 is located below the first contact portion 4221, and in this case, the first supporting portions 4231 downward support the upper surface of the first contact portion 4221, and the second supporting portions 6231 upward support the lower surface of the second contact portion 6221, which is not hereinafter limited thereto.

Referring to FIG. 3 to FIG. 5, in the first embodiment, the first guiding section 42215 passes forward beyond the first shielding shell 421. When mating of the electrical connector 2 and the mating connector 6 is complete, the second contact section 62214 of the second contact portion 6221 is in contact with the first contact section 42212 of the first contact portion 4221, and the second guiding section 62215 is exposed in the naked spacing region 4211 and is shielded by the second shielding shell 621. Thus, compared to the case where the naked spacing regions 4211 are provided at both the locations of the first shielding shell 421 corresponding to the first guiding section 42215 and the second guiding section 62215, the first shielding shell 421 according to this embodiment of the present invention does not need to be provided with a naked spacing region 4211 at the location corresponding to the first guiding section 42215, and is only provided with a naked spacing region 4211 at the location corresponding to the second guiding section 62215, thus avoiding the first guiding section 42215 and the second guiding section 62215 from being in contact with the first shielding shell 421 and short-circuiting, reducing the quantity of the naked spacing region 4211, reducing the manufacturing steps, and facilitating enhancing the production efficiency of the electrical connector 2. Further, compared to the case where the first shielding shell 421 is not provided with the naked spacing region 4211, and the first shielding shell 421 is integrally located behind the first contact section 42212 of the first contact portion 4221, the first shielding shell 421 according to this embodiment of the present invention has a larger contact area to be mated and in contact with the second shielding shell 621. For example, in the first embodiment of the present invention, the second main body surface 4213 of the first shielding shell 421 is provided with a larger contact area to be in contact with the second shielding shell 621, and the first shielding shell 421 may be more surroundingly provided around the first contact portion 4221, thus better shielding the interference signals for the first contact portion 4221.

Referring to FIG. 6 to FIG. 8 and FIG. 10A to FIG. 10B, in the first embodiment, the first shielding shell 421 has two first side surfaces 4214 provided opposite to each other, two main body surfaces and four curve transitional surfaces 4215. The two main body surfaces are provided opposite to each other in the vertical direction Z, and the two first side surfaces 4214 are provided opposite to each other in the left-right direction Y. The main body surface located above serves as a first main body surface 4212, and the main body surface located below serves as a second main body surface 4213. The two sides of the first main body surface 4212 are connected to the corresponding first side surfaces 4214 through two of the curve transitional surfaces 4215, and the two sides of the second main body surface 4213 are connected to the corresponding first side surfaces 4214 through the other two of the curve transitional surfaces 4215. The second shielding shell 621 has two second side surfaces 6213 provided opposite to each other in the left-right direction Y. Each second side surface 6213 is provided with an opening 6214, and an elastic sheet 6215 is formed by integrally extending from an inner edge of each opening 6214. When the mating of the electrical connector 2 and the mating connector 6 is complete, each elastic sheet 6215 abuts a corresponding first side surface 4214 inward, and each first side surface 4214 shields the corresponding opening 6214. Thus, by the elastic sheets 6215 on the two second side surfaces 6213 abutting the two first side surfaces 4214, the first shielding shell 421 and the second shielding shell 621 are in stable contact, and by each first side surface 4214 shielding the corresponding opening 6214, the openings 6214 may be prevented from allowing the first signal terminal 422 and the second signal terminal 622 to be interfered by outer signals. Further, the second shielding shell 621 further has a third main body surface 6211 and a fourth main body surface 6212 provided opposite to each other in the vertical direction. The third main body surface 6211 is located above and is connected to the two second side surfaces 6213, and the fourth main body surface 6212 is located below and is connected to the two second side surfaces 6213. The second shielding shell 621 forms a tube-shaped structure. The third main body surface 6211 of the second shielding shell 621 has two protruding bumps 6216 protruding inward, and each protruding bump 6216 abuts the first main body surface 4212 of the first shielding shell 421 inward. The fourth main body surface 6212 of the second shielding shell 621 also has an elastic sheet 6215 abutting the second main body surface 4213 of the first shielding shell 421 inward, thus further increasing the contact stability between the first shielding shell 421 and the second shielding shell 621.

Figure 7:
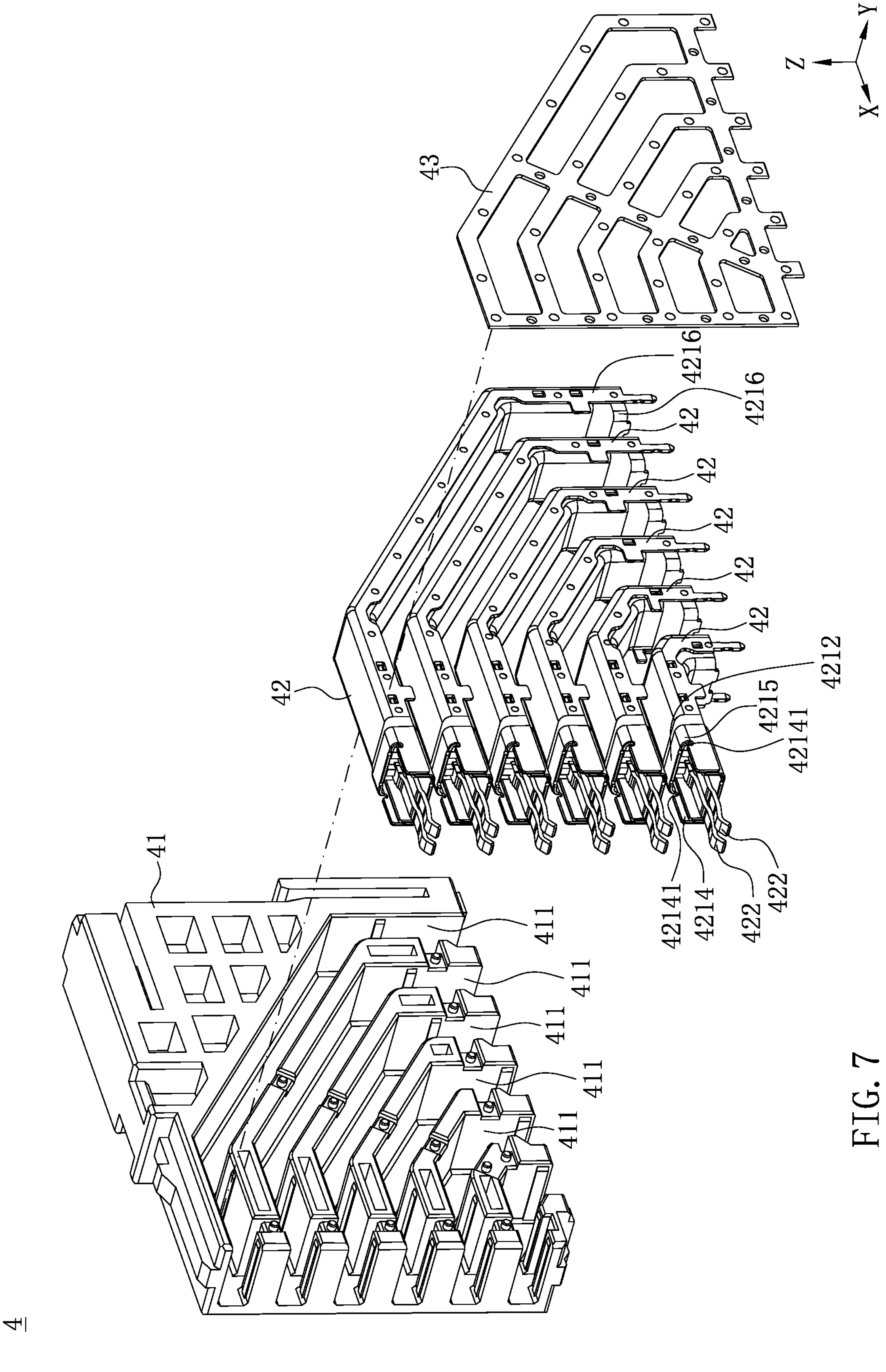
FIG. 7 is a disassembled view of an electrical module according to the first embodiment of the present invention.

Referring to FIG. 6 to FIG. 8, in the first embodiment, the naked spacing region 4211 is formed by being backward concavely provided from a front end of the first main body surface 4212. Each first side surface 4214 is provided with a slot 42141 in communication with the naked spacing region 4211. The slot 42141 is provided between the first side surface 4214 and a corresponding curve transitional surface 4215 at a same side. A connecting location of the corresponding curve transitional surface 4215 and the first side surface 4214 is shown as the connecting line L, the front end of each first side surface 4214 extends toward the naked spacing region 4211 beyond the connecting line L, and the front end of each first side surface 4214 shields the corresponding opening 6214. In this embodiment, the naked spacing region 4211 is located above, so the front end of each first side surface 4214 extends upward beyond the connecting line L. In other embodiments, the naked spacing region 4211 may be located below, and the front end of each first side surface 4214 extends downward beyond the connecting location of the first side surface 4214 and the corresponding curve transitional surface 4215, which is not hereinafter limited thereto. Thus, the front end of each first side surface 4214 is separated from the corresponding curve transitional surface 4215 by the slot 42141, thus facilitating forming the front end of each first side surface 4214 to extend toward the naked spacing region 4211 beyond the connecting line L, and increasing the area of the front end of each first side surface 4214 to be in contact with the second shielding shell 621 or to shield the corresponding opening 6214. Moreover, if the first shielding shell 421 is formed by firstly cutting the naked spacing region 4211 from a single-sheet material, and then bending the curve transitional surfaces 4215, since the curve transitional surfaces 4215 are curve shaped and bending, if the slot 42141 is not provided, a portion of the front end of each first side surface 4214 passing beyond the connecting line L may be difficult to form the curve, and the joining locations of multiple edges of the naked spacing region 4211 may be easily torn. Thus, the slot 42141 separates the front end 4214 of each first side surface 4214 and the corresponding curve transitional surface 4215, thus providing transitional functions, and facilitating forming of the first shielding shell 421.

Referring to FIG. 8, in the first embodiment, the first shielding shell 421 includes two U-shaped shielding bodies 4216. The two U-shaped shielding bodies 4216 are assembled to each other to form a tube-shaped structure, and the naked spacing region 4211 is formed on one of the two U-shaped shielding bodies 4216. The second shielding shell 621 is formed in a tube-shaped structure. When the mating of the electrical connector 2 and the mating connector 6 is complete, the first shielding shell 421 and the second shielding shell 621 are mated to each other to completely cover the first contact portion 4221 and the second contact portion 6221. Thus, compared to the case where the naked spacing region 4211 is cut on an integral tube-shaped structure, which has the issues that positioning is difficult and the tube-shaped first shielding shell 421 may be easily extruded and deformed, in this embodiment of the present invention, the naked spacing region 4211 is formed in one of the U-shaped shielding bodies 4216, and the two U-shaped shielding bodies 4216 are assembled to each other to form the tube-shaped structure, such that the U-shaped shielding bodies 4216 may be easily positioned during forming of the naked spacing region 4211, and there is no issue that the first shielding shell 421 is extruded and deformed during forming of the naked spacing region 4211, thus reducing the machining difficulties. Meanwhile, the second shielding shell 621 and the first shielding shell 421 completely cover the first contact portion 4221 and the second contact portion 6221 altogether, thus effectively shielding the interference signals from the outer environment for the first contact portion 4221 and the second contact portion 6221, and further enhancing the high frequency characteristics of the electrical connecting assembly 1. The side surfaces of the two U-shaped shielding bodies 4216 are coupled together to form the first side surfaces 4214.

Referring to FIG. 1 to FIG. 4, the first signal terminals 422 of the electrical connector 2 are soldered to the first base plate 7 through solder balls, such that the first signal terminals 422 of the electrical connector 2 have better coplanarity. The electrical connector 2 further includes a planar body 5, and the planar body 5 and the insulating bodies 41 of the electrical modules 4 are fixed. An upper surface of the planar body 5 is a horizontal surface. Thus, when the electrical connector 2 is soldered to the first base plate 7, the planar body 5 provides the horizontal surface for a vacuum suction cup (not shown) to suck and move it to the first base plate 7, such that the first signal terminals 422 are soldered to the first base plate 7 through the solder balls.

Referring to FIG. 8, the first insulating block 423 includes a first insert-molding member 4232 and a second insert-molding member 4233, where the first insert-molding member 4232 is firstly molded and formed on the first connecting portions 4222 of the first signal terminals 422, and then the second insert-molding member 4233 is molded and formed on the first insert-molding member 4232 and the first signal terminals 422. The first insert-molding member 4232 has a plurality of fixing portions, and when the second insert-molding member 4233 is molded and formed, the mold positions and fixes the first signal terminals 422 and the first insert-molding member 4232 by the fixing portions. Specifically, the fixing portions include first fixing portions 42321 and second fixing portions 42322. When the second insert-molding member 4233 is formed, the first insert-molding member 4232 and the first signal terminals 422 are fixed by the first fixing portions 42321 in the vertical direction Z, and the first insert-molding member 4232 and the first signal terminals 422 are fixed by the second fixing portions 42322 in the left-right direction Y. It should be noted that, if the first insulating block 423 is formed by a single insert-molding process, the mold clamps the first signal terminals 422 for positioning, and after forming, the mold is removed, the first insulating block 423 would be exposed at the locations of the first signal terminals 422 being clamped by the mold, resulting in the medium around each first connecting portion 4222 to be different, and affecting the consistency of the impedance of the first signal terminals 422. In this embodiment of the present invention, when the second insert-molding member 4233 is formed, there is no need for the mold to clamp the first signal terminals 422, and after the first insulating block 423 is completely formed, each first connecting portion 4222 is completely covered in the insulating material, such that the medium around each first connecting portion 4222 is identical, thus facilitating the consistency of the impedance of the first signal terminals 422.

Figure 11A:
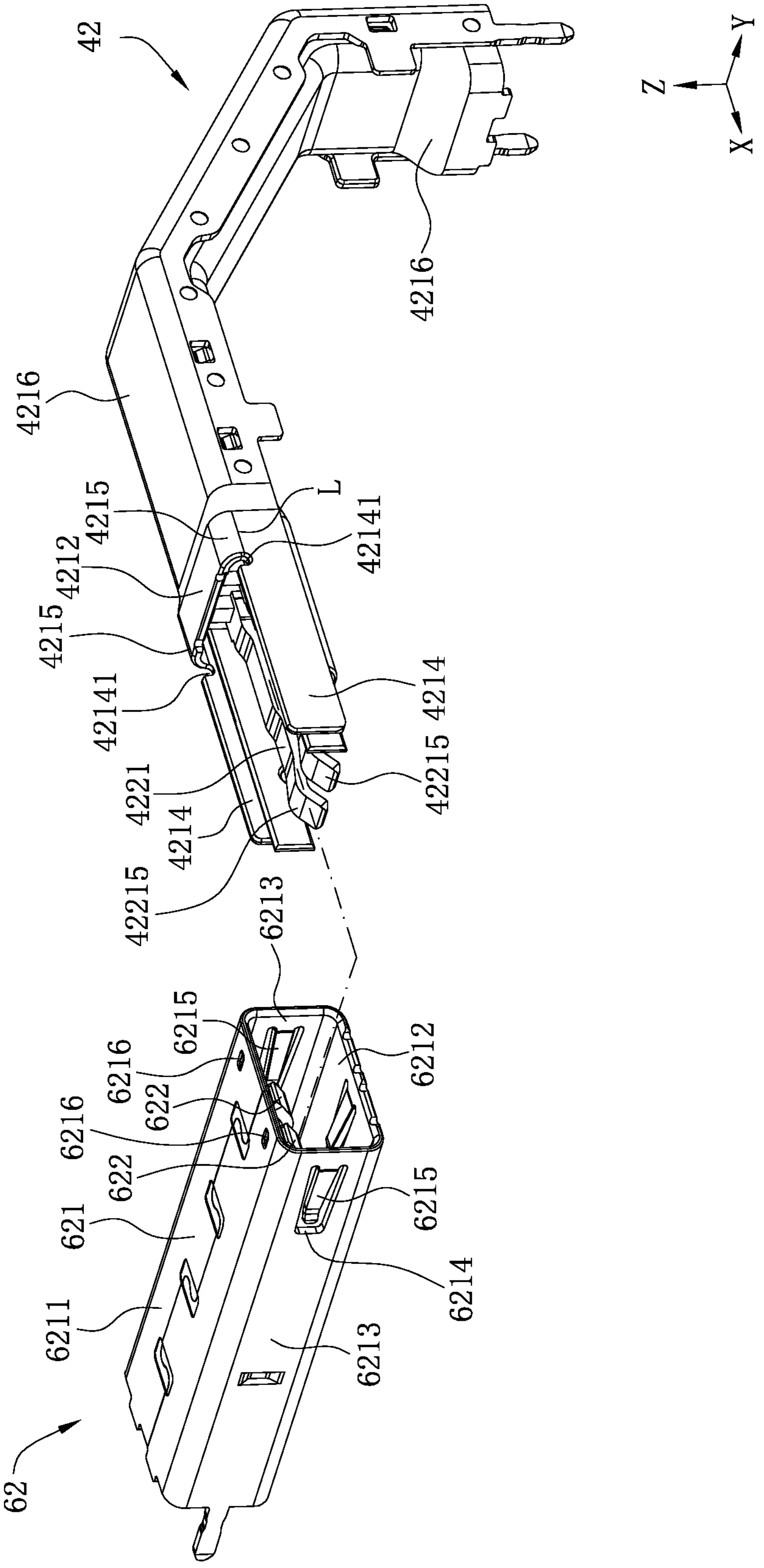
FIG. 11A is a perspective view of a first terminal assembly and a second terminal assembly prior to mating according to a second embodiment of the present invention.
Figure 11B:
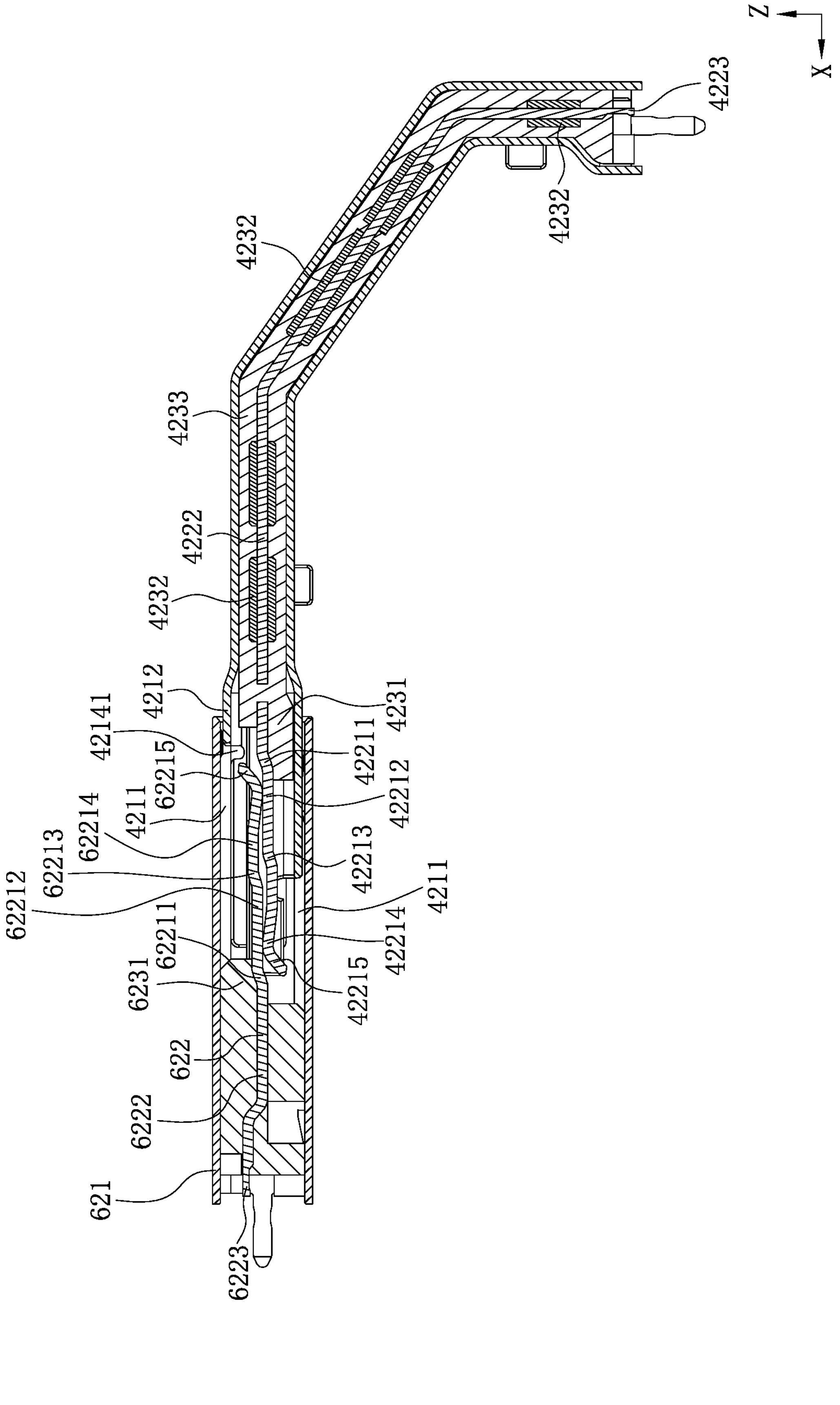
FIG. 11B is a perspective view of a first terminal assembly and a second terminal assembly after completion of mating according to the second embodiment of the present invention.

Referring to FIG. 11A to FIG. 11B show schematic views of a second embodiment of the present invention. The second embodiment is different from the first embodiment in that: the first shielding shell 421 is provided with two naked spacing regions 4211. When the mating of the electrical connector 2 and the mating connector 6 is complete, the first contact portion 4221 is exposed in one of the naked spacing regions 4211, the second contact portion 6221 is exposed in the other of the naked spacing regions 4211, and the two naked spacing regions 4211 are both shielded by the second shielding shell 621. Thus, in the second embodiment of the present invention, the first contact portion 4221 and the second contact portion 6221 are respectively exposed in the two naked spacing regions 4211 of the first shielding shell 421, such that the first contact portion 4221 and the second contact portion 6221 are not in contact with the first shielding shell 421 in the vertical direction, thus preventing the first contact portion 4221 and the second contact portion 6221 from being in contact with the first shielding shell 421 and short-circuiting. Meanwhile, the second shielding shell 621 shields the naked spacing regions 4211, which may prevent the naked spacing regions from causing the first contact portion 4221 and the second contact portion 6221 to be affected by the interference signals from the outer environment.

Figure 12A:
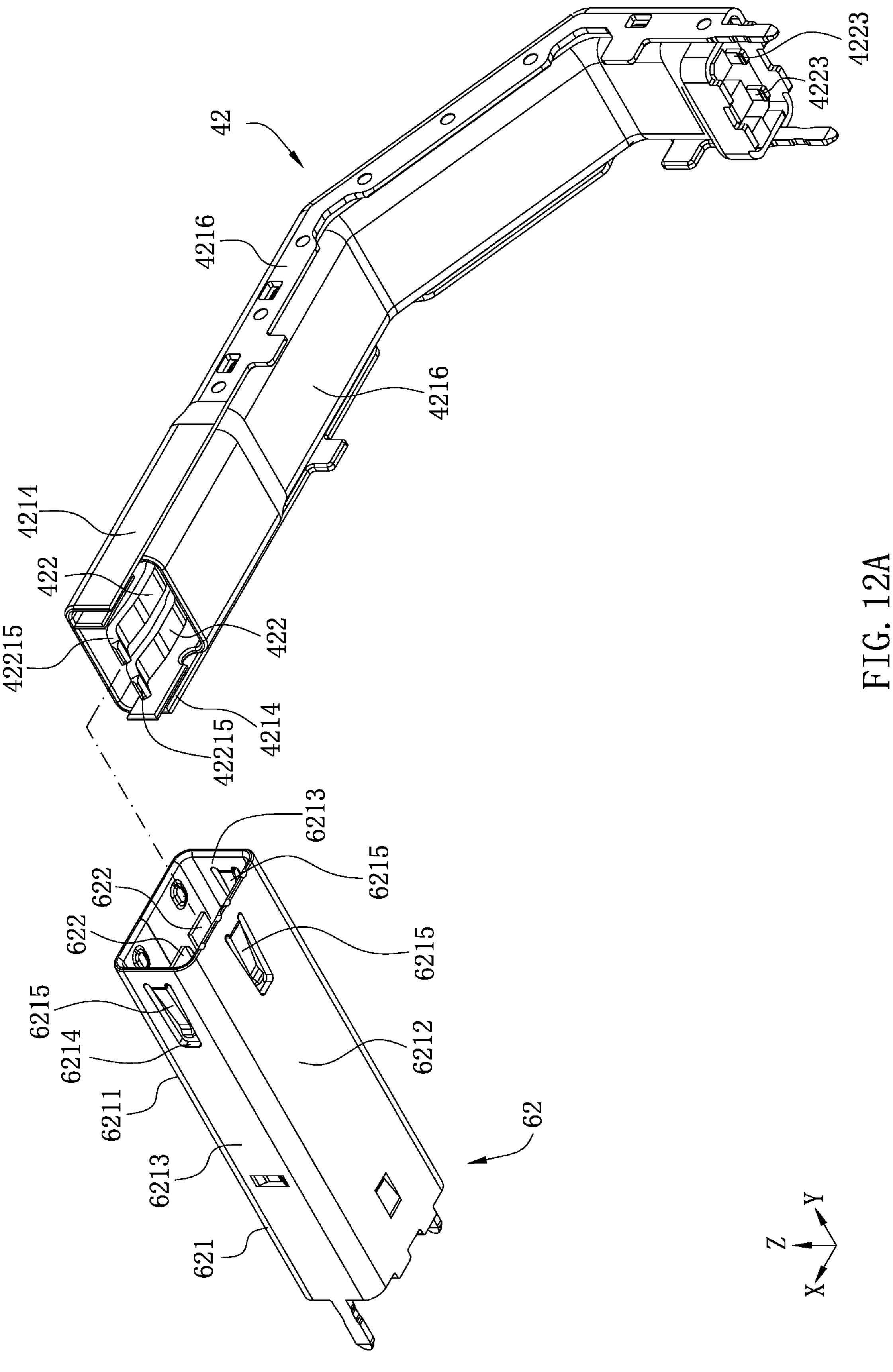
FIG. 12A is a perspective view of a first terminal assembly and a second terminal assembly prior to mating according to a third embodiment of the present invention.
Figure 12B:
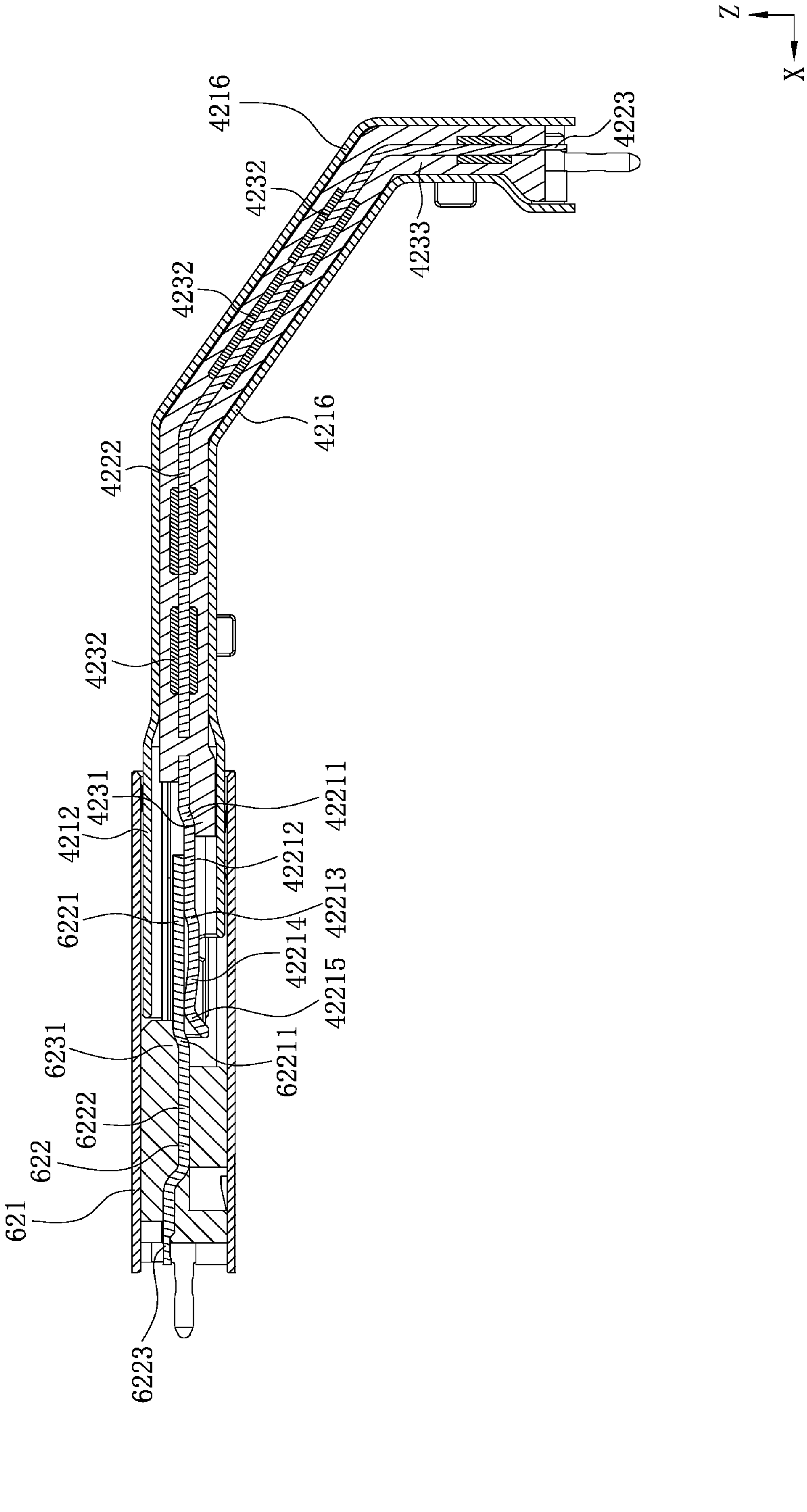
FIG. 12B is a perspective view of a first terminal assembly and a second terminal assembly after completion of mating according to the third embodiment of the present invention.
Figure 13:
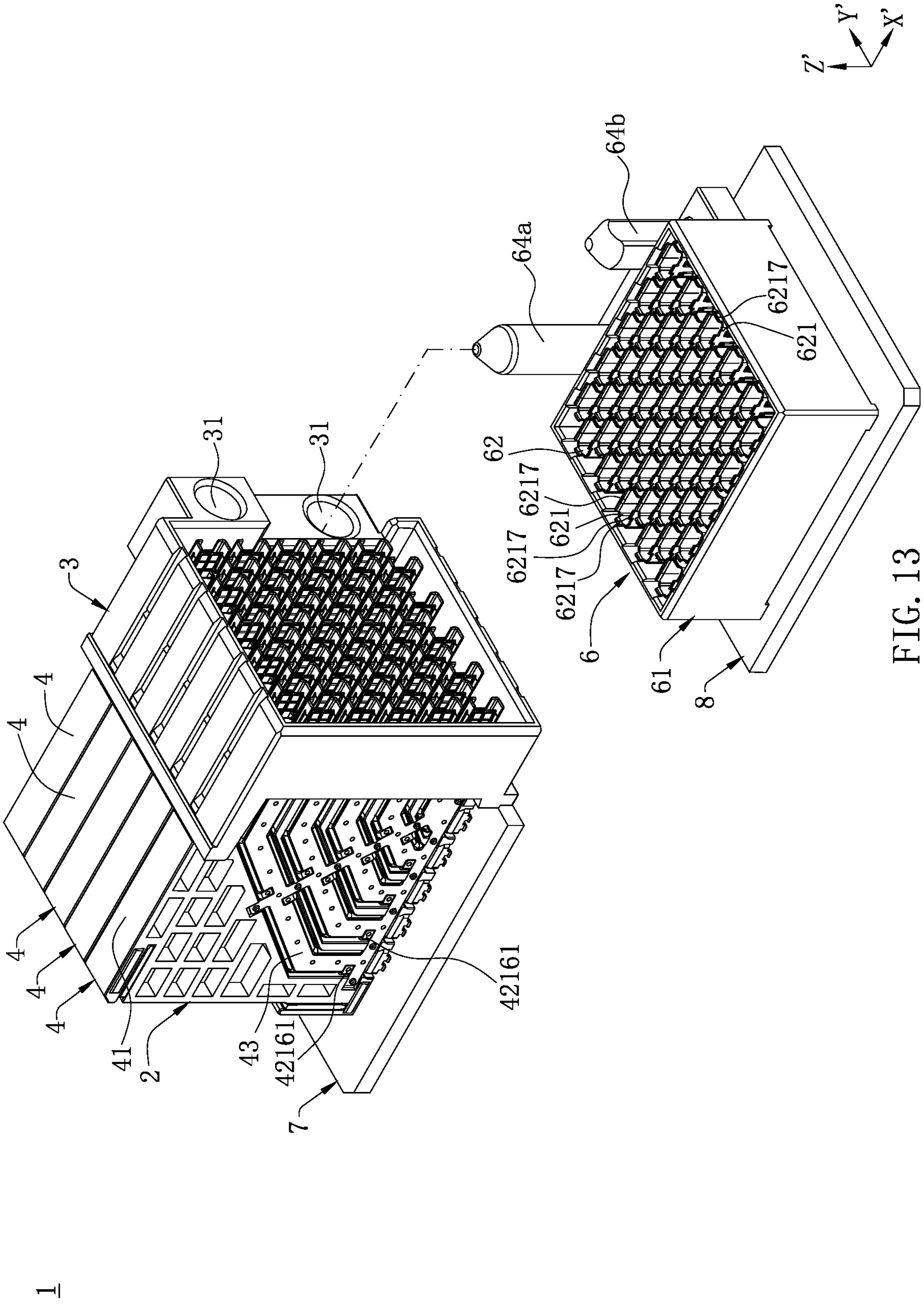
FIG. 13 is a perspective schematic view of an electrical connecting assembly according to a fourth embodiment of the present invention.
Figure 14:
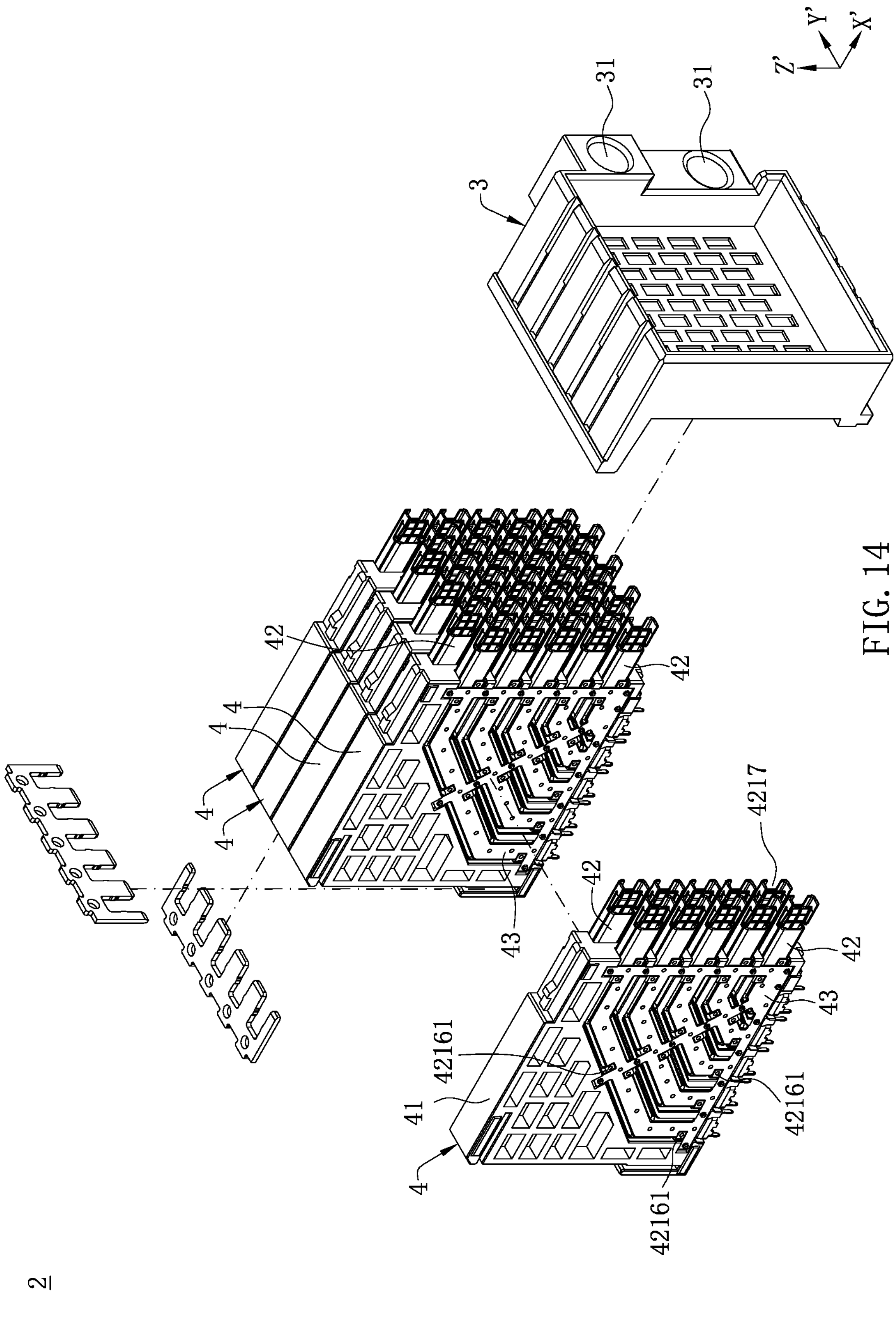
FIG. 14 is a partial disassembled view of an electrical connector according to the fourth embodiment of the present invention.
Figure 15:
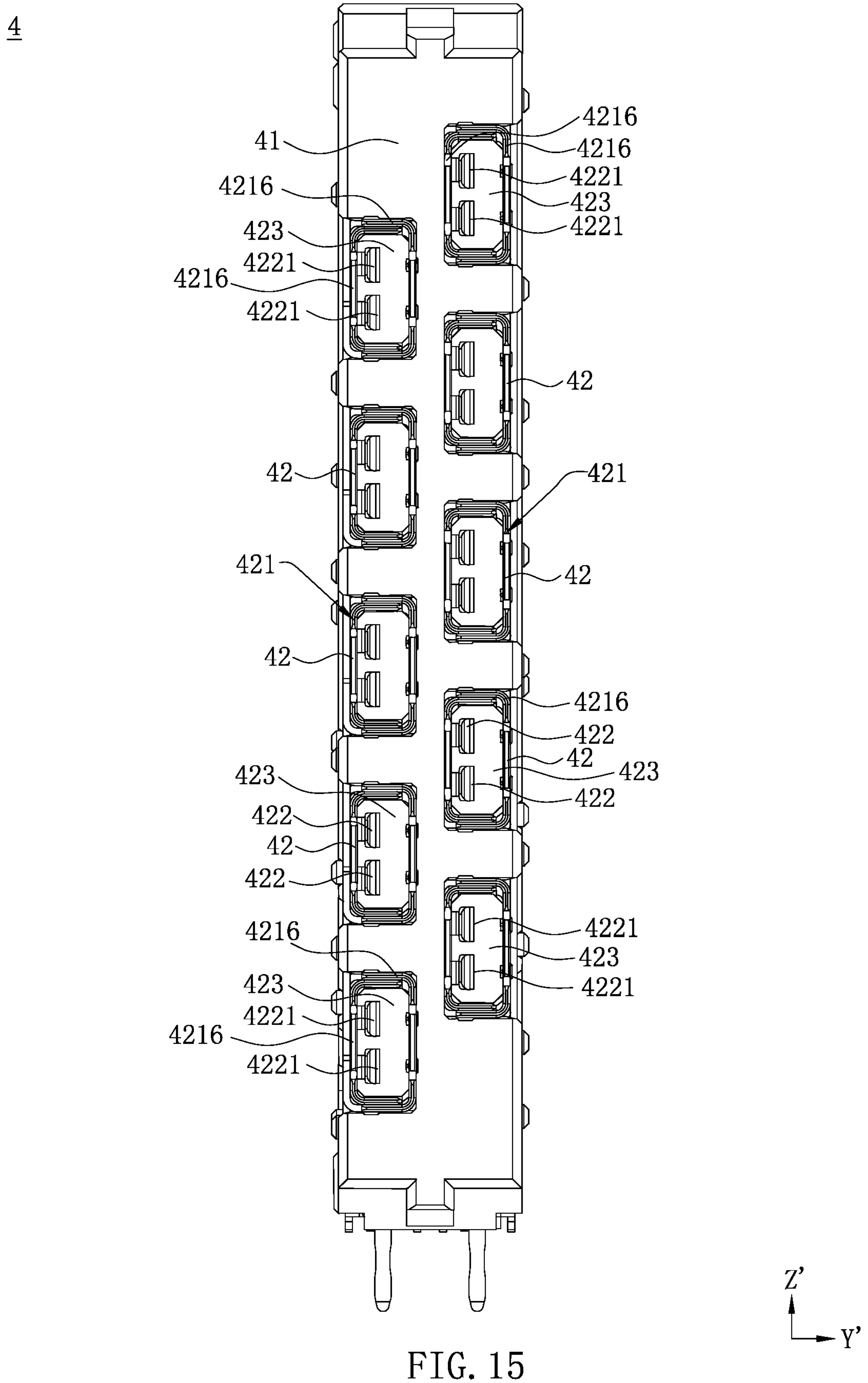
FIG. 15 is a plain view of an electrical module being viewed backward along a front-rear direction according to the fourth embodiment of the present invention.

Referring to FIG. 12A to FIG. 12B show schematic views of a third embodiment of the present invention. The third embodiment is different from the first embodiment in that: the first shielding shell 421 is provided with a naked spacing region 4211. When the mating of the electrical connector 2 and the mating connector 6 is complete, the first contact portion 4221 is exposed in the naked spacing region 4211, and the naked spacing region 4211 is shielded by the second shielding shell 621. Thus, in the third embodiment of the present invention, the first contact portion 4221 is exposed in the naked spacing region 4211 of the first shielding shell 421, such that the first contact portion 4221 is not in downward contact with the first shielding shell 421, thus preventing the first contact portion 4221 from being in contact with the first shielding shell 421 and short-circuiting. Meanwhile, the second shielding shell 621 shields the naked spacing region 4211, which may prevent the naked spacing region from causing the first contact portion 4221 to be affected by the interference signals from the outer environment.

In the third embodiment, the second contact portion 6221 is flat plate shaped, and the first contact portion 4221 is a bending elastic contact portion. It should be understandable that, compared to the case where the second contact portion 6221 is also a bending elastic contact portion, in the third embodiment, the risk of the second contact portion 6221 being in contact with the first shielding shell 421 and short-circuiting is relatively lower, and correspondingly, the first shielding shell 421 is provided with the naked spacing region 4211 only specific to the first contact portion 4221. However, it should be noted that, when the height of the first shielding shell 421 along the vertical direction Z is shorter, such that the electrical connector 2 is more miniaturized, even though the first contact portion 4221 or the second contact portion 6221 is a flat plate shaped structure, there is a risk of being in contact with the first shielding shell 421 after mating. In this case, it is possible to provide the naked spacing region 4211 corresponding to the first contact portion 4221 or the second contact portion 6221 in the flat plate shape. Further, when the first contact portion 4221 and the second contact portion 6221 are both bending elastic contact portions, it is possible to provide the naked spacing region 4211 specific to only one of the first contact portion 4221 and the second contact portion 6221. For example, when the first guiding section 42215 of the first contact portion 4221 is longer, the second guiding section 52215 of the second contact portion 6221 is shorter, and there is a sufficient distance between the second contact portion 6221 and the first shielding shell 421, even though the second contact portion 6221 is a bending elastic contact portion, it is possible to provide the naked spacing region 4211 only specific for the first contact portion 4221, without providing the naked spacing region 4211 specific for the second contact portion 6221. Thus, the three embodiments of the present invention are merely schematics for certain examples of the present invention, and the shapes of the first contact portion 4221 and the second contact portion 6221 as well as the quantity and location of the naked spacing region 4211 of the first shielding shell 421 may be provided with different combinations based on the actual need. That is, for a flat plate shaped contact portion, the first shielding shell 421 may be provided with a corresponding naked spacing region 4211 or without the corresponding naked spacing region 4211. Similarly, for a bending elastic contact portion, the first shielding shell 421 may be provided with a corresponding naked spacing region 4211 or without the corresponding naked spacing region 4211. The three embodiments of the present invention are merely schematics without being limited thereto.

It should be noted that, in the three embodiments as disclosed above, the first contact portion 4221 and the second contact portion 6221 abut each other along the vertical direction Z, and the vertical direction Z serves as the abutting direction of the first contact portion 4221 and the second contact portion 6221. In other embodiments, the first contact portion 4221 and the second contact portion 6221 may abut each other along the left-right direction Y or the front-rear direction X, and the left-right direction Y or the front-rear direction X may serve as the abutting direction of the first contact portion 4221 and the second contact portion 6221. Thus, the naked spacing region 4211 of the first shielding shell 421 is provided at a location corresponding to the first contact portion 4221 or the second contact portion 6221, which is not hereinafter limited thereto. The naked spacing region 4211 is not limited to be concavely formed backward from the front end of the first shielding shell 421, and the naked spacing region 4211 may be surroundingly provided in a circular or polygonal hole shape.

FIG. 13 to FIG. 23 show the technical solution according to a fourth embodiment of the present invention. For convenience of understanding the technical solutions of the present invention, in the three-dimensional coordinate as shown in the accompanied drawings of the fourth embodiment, the X'-axis is defined as a front-rear direction, the Y'-axis is defined as a left-right direction, and the Z'-axis is defined as a vertical direction. Any two of the X'-axis, the Y'-axis and the Z'-axis are perpendicular to each other.

As shown in FIG. 13 to FIG. 19, the difference from the first embodiment exists in that, in the fourth embodiment, the first insulating mating shell 3 of the electrical connector 2 is further provided with two guiding insertion slots 31, and each electrical module 4 has an insulating body 41, a plurality of first terminal assemblies 42, and two shielding members 43. The insulating body 41 is provided with a plurality of accommodating slots 411 arranged in two rows, and the accommodating slots 411 are formed by being concavely provided at two opposite sides of the insulating body 41. The first terminal assemblies 42 are arranged in two rows, and the first terminal assemblies 42 in the two rows are laterally assembled to the insulating body 41 respectively from the two sides of the insulating body 41 and are accommodated in the corresponding accommodating slots 411. The first terminal assemblies 42 in each row are arranged along the vertical direction Z' and are in contact with a corresponding one of the shielding members 43, and the two shielding members 43 are respectively fixed to the two sides of the insulating body 41.

Referring to FIG. 15 to FIG. 18, the two first signal terminals 422 of each first terminal assembly 42 are arranged along the vertical direction Z' and are coupled in a narrow side thereof. The first shielding shell 421 of each first terminal assembly 42 is formed by being surroundingly provided by two U-shaped shielding bodies 4216. One of the U-shaped shielding bodies 4216 is provided with a plurality of extending arms 42161, and the extending arms 42161 are fixed to an outer surface of the other of the U-shaped shielding bodies 4216, such that the two U-shaped shielding bodies 4216 are positioned to each other by the extending arms 42161, thus reducing the fixing holes being provided on the U-shaped shielding bodies 4216 for fixing, and enhancing the shielding effect of the first shielding shell 421. It should be noted that, of the same electrical module 4, the first terminal assemblies 42 in the two rows are deviated from each other along the vertical direction Z' and are adjacent to each other along the left-right direction Y', and projections of the first signal terminals 422 of the first terminal assemblies 42 in the two rows along the left-right direction Y' are staggered and do not overlap, thus reducing the signal interferences between the first signal terminals 422 in the two rows. FIG. 19 shows the first signal terminals of the first terminal assemblies in two adjacent rows, and viewing along the left-right direction Y', the first signal terminals in the two adjacent rows are completely staggered. It should be noted that the extending arms 42161 may be provided to be toward the shielding members 43, and the shielding members 43 are provided with corresponding grooves reserved for the extending arms 42161. The extending arms 42161 may be provided to be toward inner wall surfaces of the accommodating slots 411, and the inner wall surfaces of the accommodating slots are provided with corresponding recess areas reserved for the extending arms 42161.

Figure 16:
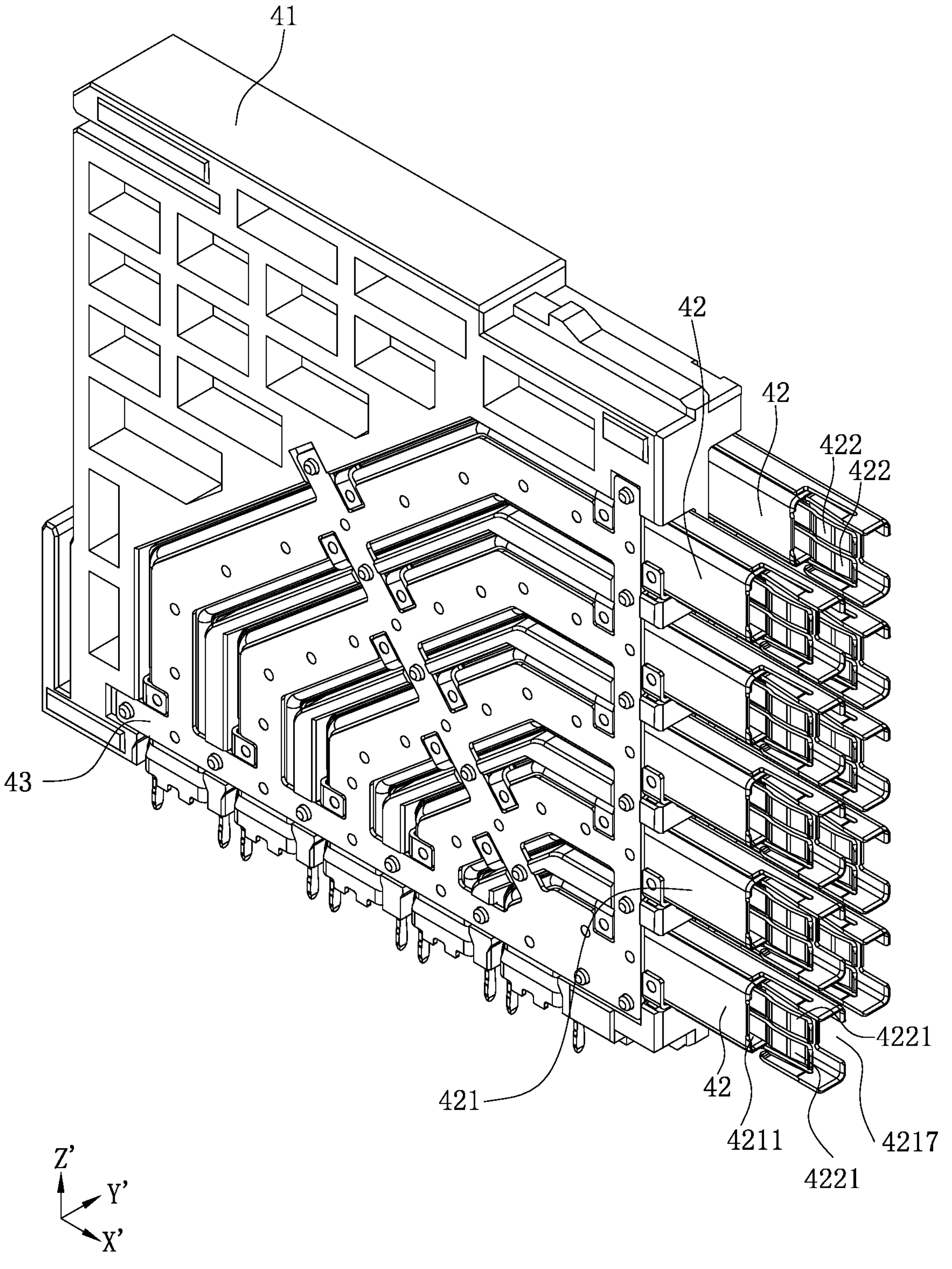
FIG. 16 is a perspective schematic view of an electrical module according to the fourth embodiment of the present invention.
Figure 17:
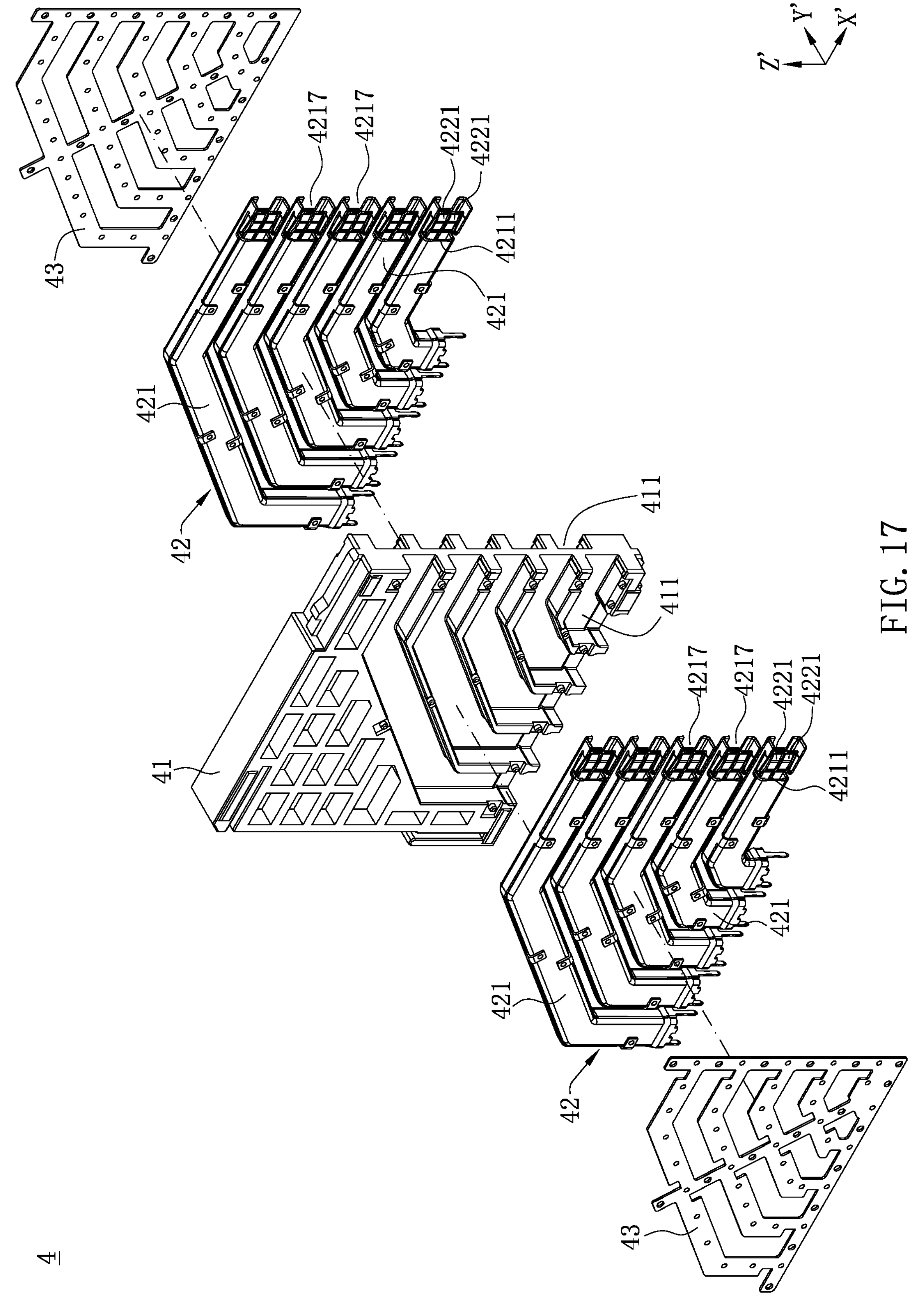
FIG. 17 is a perspective disassembled view of an electrical module according to the fourth embodiment of the present invention.
Figure 18:
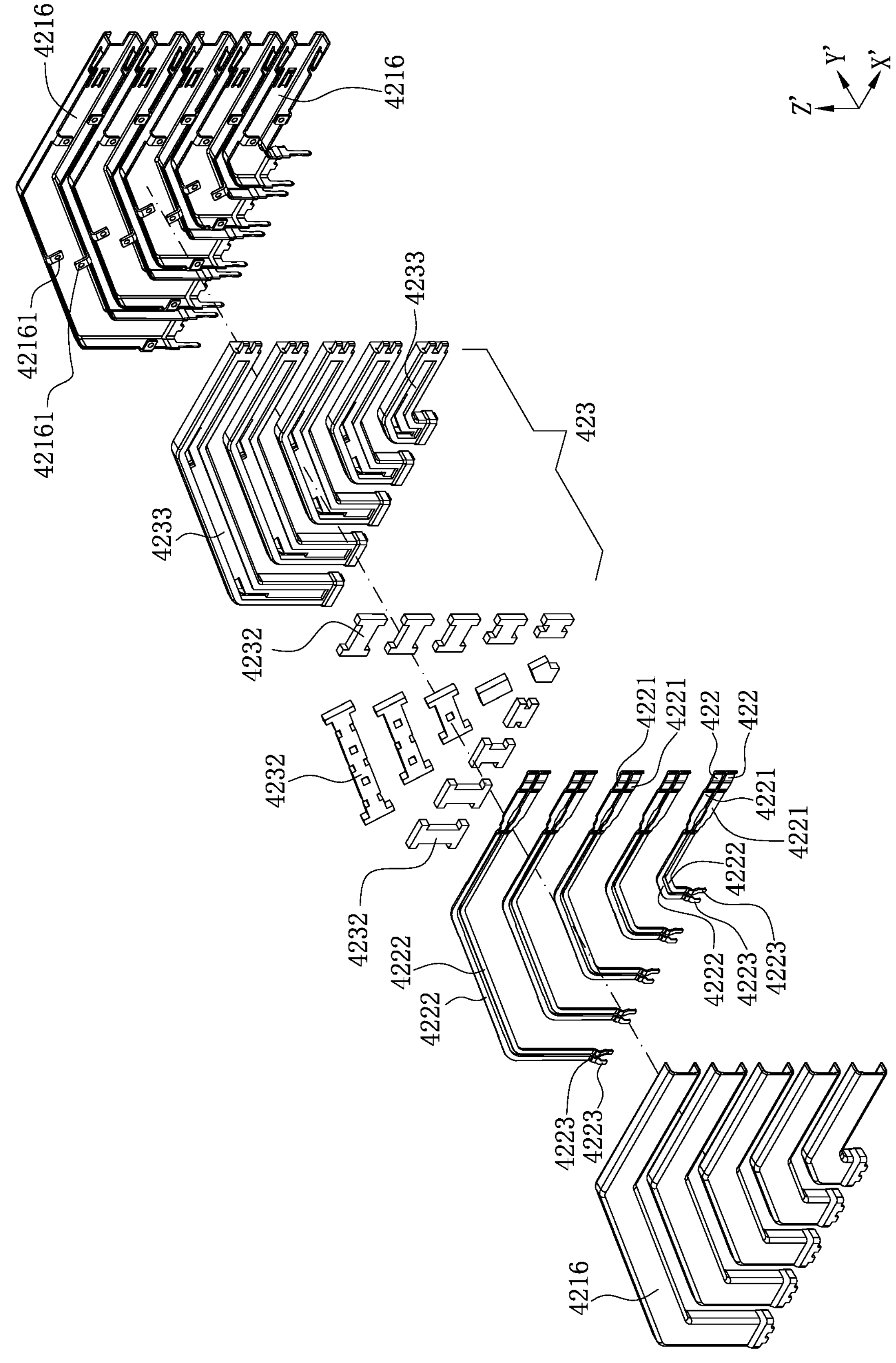
FIG. 18 is a perspective disassembled view of a plurality of first terminal assemblies in one row according to the fourth embodiment of the present invention.
Figure 19:
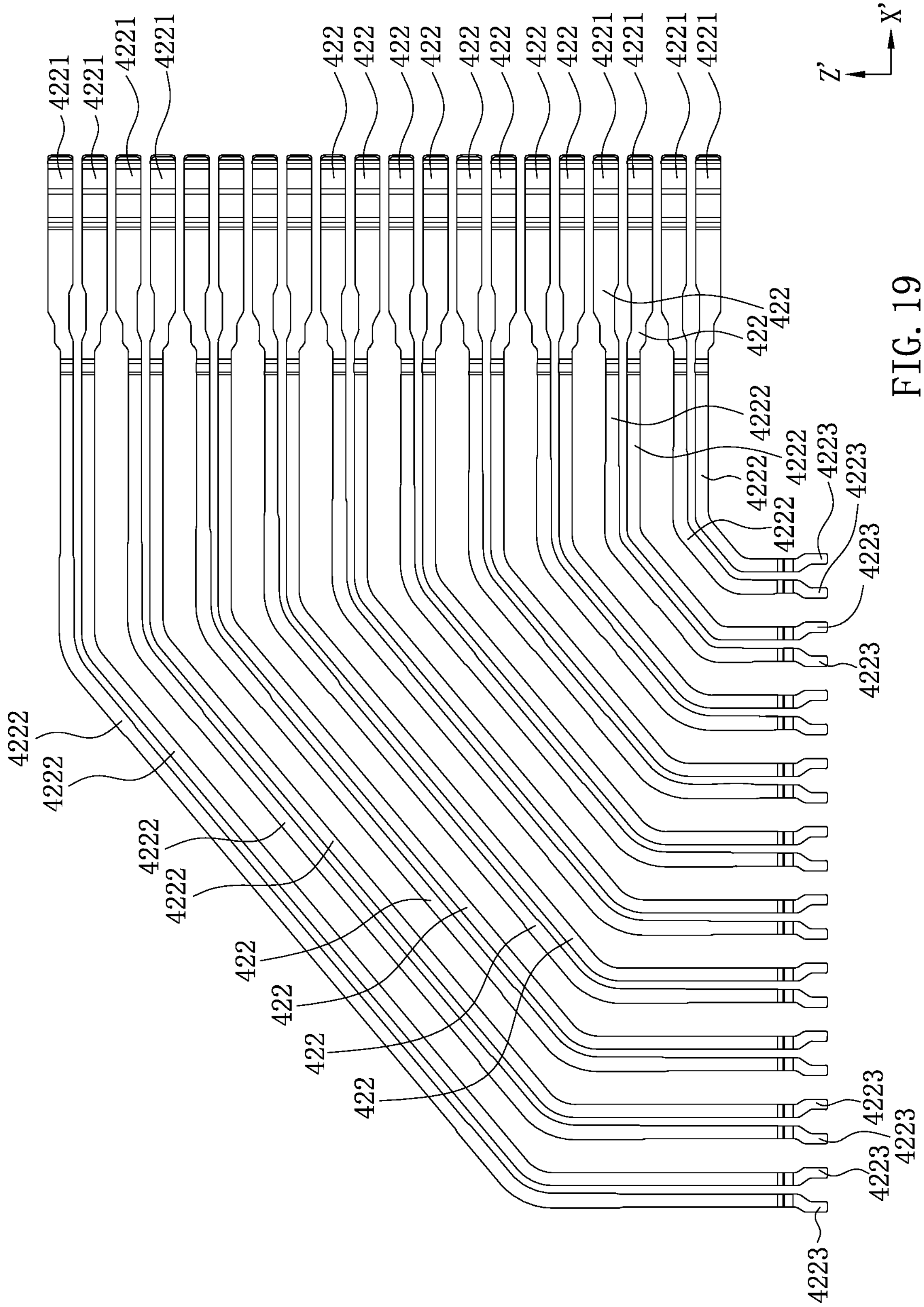
FIG. 19 is a schematic view of the first signal terminals of the first terminal assemblies in two adjacent rows viewing along a left-right direction according to the fourth embodiment of the present invention.

Referring to FIG. 16 to FIG. 18, the first shielding shell 421 is provided with a naked spacing region 4211, and the naked spacing region 4211 exposes the first contact portion 4221. The first shielding shell 421 is further provided with a reserved slot 4217, and the reserved slot 4217 and the naked spacing region 4211 are provided opposite to each other. Specifically, a forward extending length of one of the U-shaped shielding bodies 4216 is shorter than a forward extending length of the other of the U-shaped shielding bodies 4216, and the U-shaped shielding body 4216 with a longer extending length is provided with the reserved slot 4217, such that after the two the U-shaped shielding bodies 4216 are assembled to form the first shielding shell 421, the first shielding shell 421 has the naked spacing region 4211 and the reserved slot 4217 provided opposite to each other. In other embodiments, the first shielding shell 421 may be integrally formed or may be formed by multiple structures in other shapes, and is surroundingly provided around the first signal terminals 422. The naked spacing region 4211 and the reserved slot 4217 are respectively provided on two opposite side walls of the first shielding shell 421.

Figure 20:
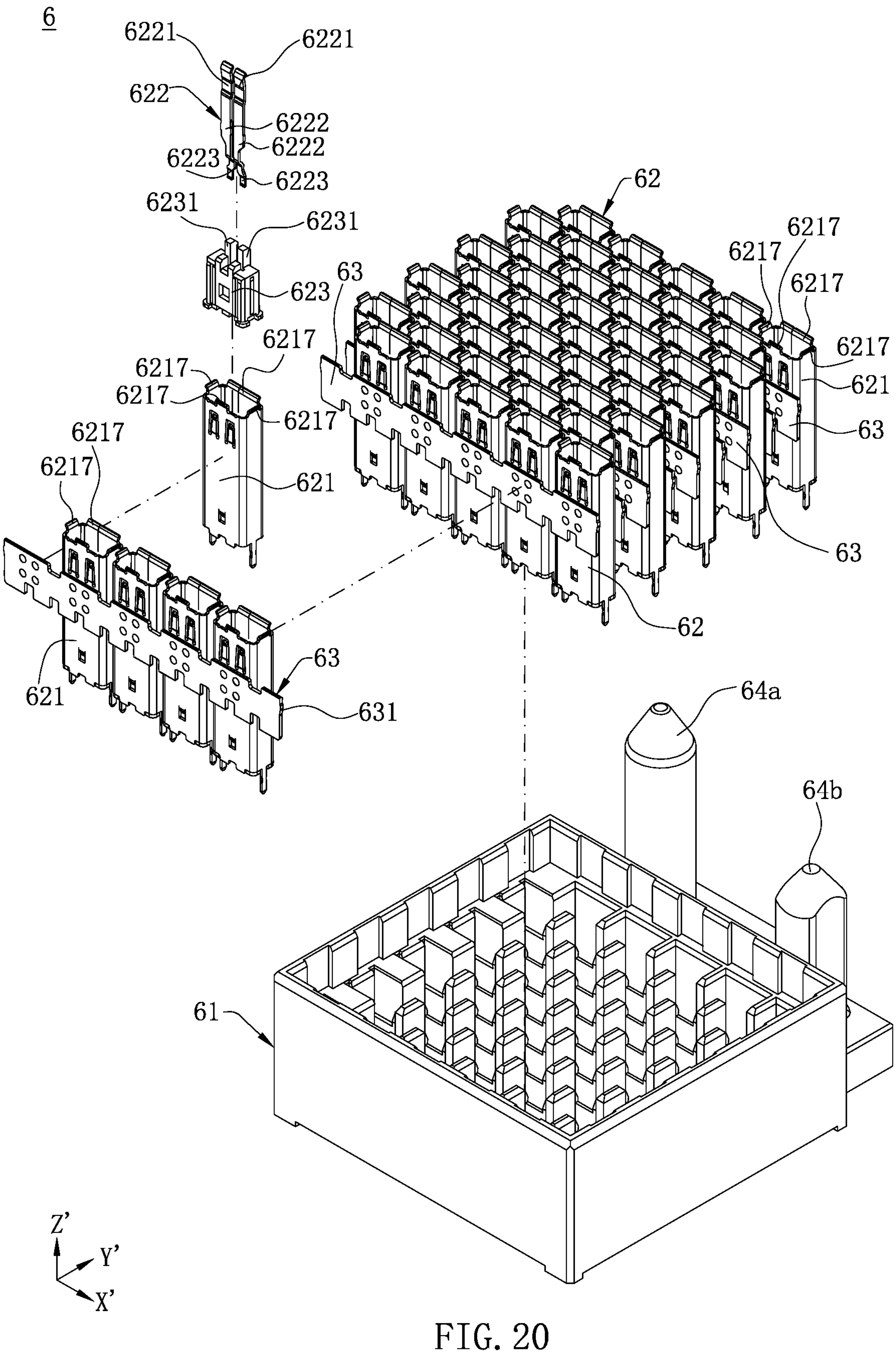
FIG. 20 is a perspective disassembled view of a mating connector according to the fourth embodiment of the present invention.
Figure 21:
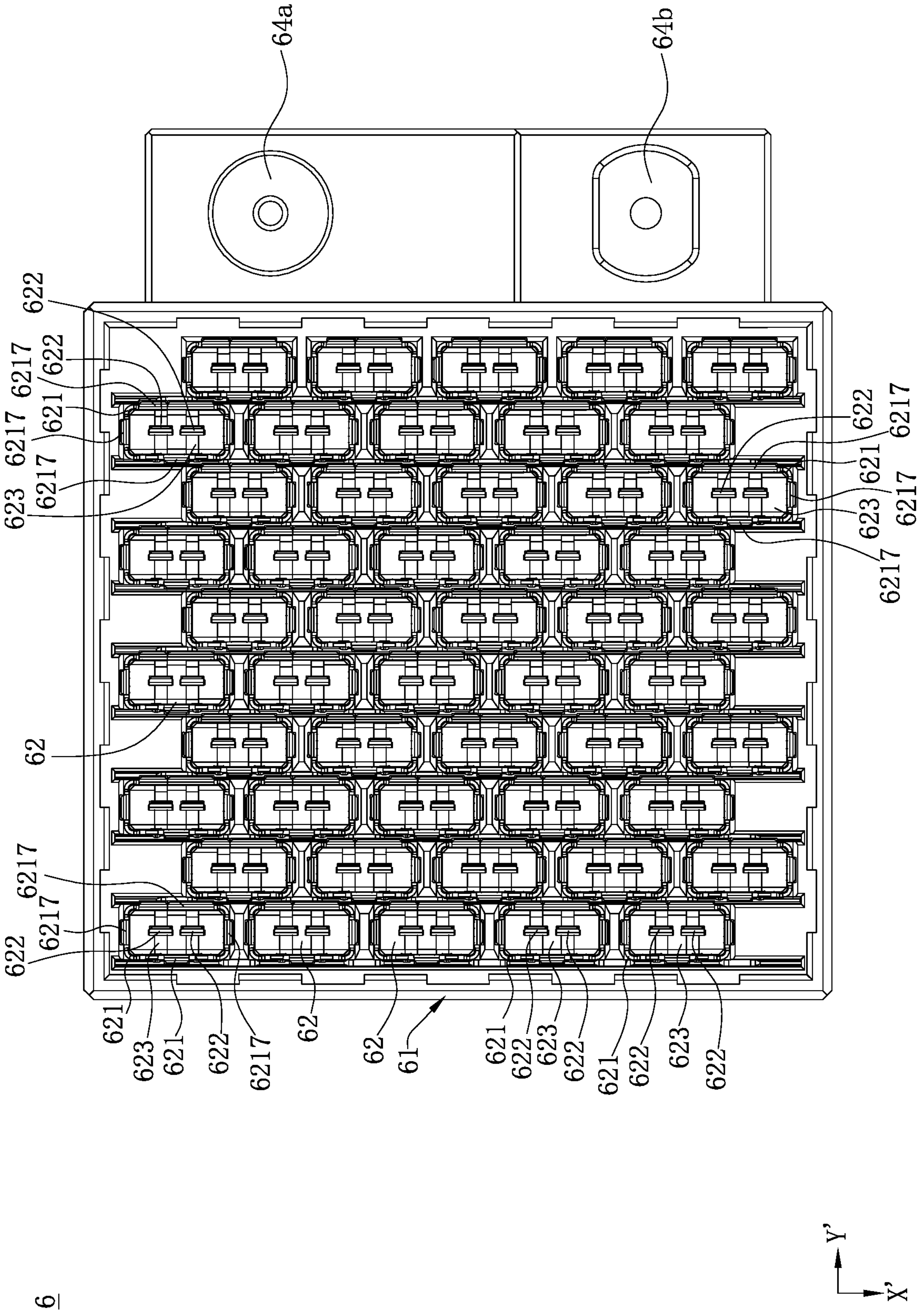
FIG. 21 is a plain view of the mating connector being viewed downward along a vertical direction according to the fourth embodiment of the present invention.

Referring to FIG. 20 to FIG. 21, the mating connector 6 includes a second insulating mating shell 61, a plurality of second terminal assemblies 62, a plurality of grounding bars 63 and two guiding posts. The second terminal assemblies 62 are fixed to the second insulating mating shell 61 and are arranged in a plurality of rows. In each row, the second terminal assemblies 62 are arranged along the front-rear direction X'. The second terminal assemblies 62 in the two adjacent rows are deviated from each other, such that the projections of the second signal terminals 622 in the two adjacent rows along the left-right direction Y' are completely staggered, thus reducing the signal interferences between the second signal terminals 622 in the two adjacent rows. Each grounding bar 63 is in contact with the second shielding shells 621 of the second terminal assemblies 62 of a corresponding row. The two guiding posts are used to be inserted into the two guiding insertion slots 31 of the electrical connector 2. The two guiding posts include a first guiding post 64*a* and a second guiding post 64*b*. A length of the first guiding post 64*a* is greater than a length of the second guiding post 64*b*. In the mating process of the electrical connector 2 and the mating connector 6, the first guiding post 64*a* is firstly guided and inserted into a corresponding one of the guiding insertion slots 31 to perform an initial guided positioning for the electrical connector 2 and the mating connector 6, and then the second guiding post 64*b* is inserted with the other of the guiding insertion slots 31 to further perform an accurate positioning for the electrical connector 2 and the mating connector 6. Since the first guiding post 64*a* is used to perform the initial positioning, the first guiding post 64*a* has a larger breaking risk. Thus, the first guiding post 64*a* may be made of a material with a greater strength, such as a metal material. The second guiding post 64*b* has a lower breaking risk, and to reduce the production cost, the second guiding post 64*b* may be made of a material with a lower strength and lower cost, such as a plastic material. The second shielding shell 621 is further provided with a guiding portion 6217, such that in the mating process of the electrical connector 2 and the mating connector 6, the first shielding shell 421 is smoothly guided to enter the second shielding shell 621. In other embodiments, the second shielding shell 621 may be mated to enter the first shielding shell 421.

Figure 22:
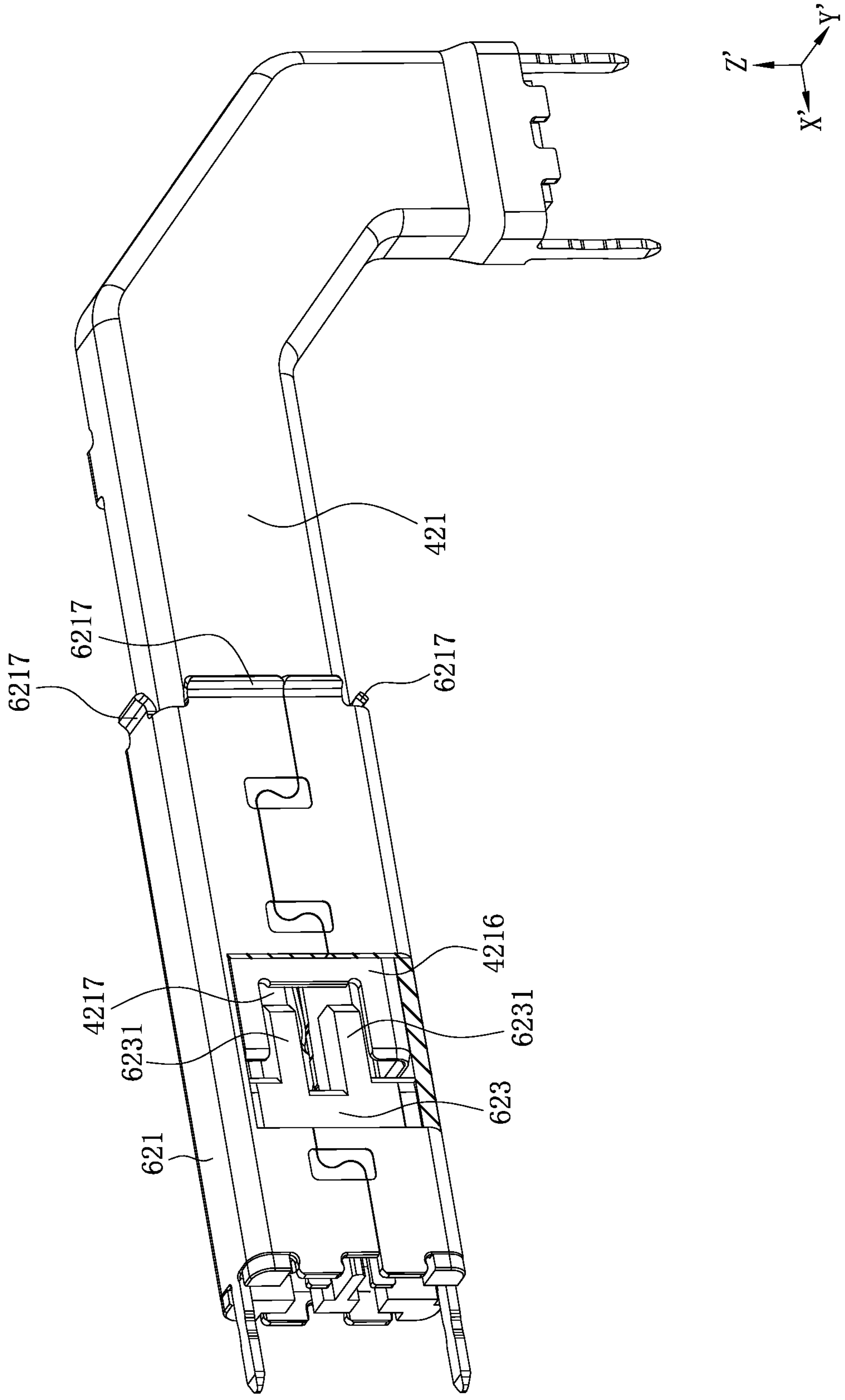
FIG. 22 is a partial sectional view of a first terminal assembly and a second terminal assembly after completion of mating according to the fourth embodiment of the present invention.
Figure 23:
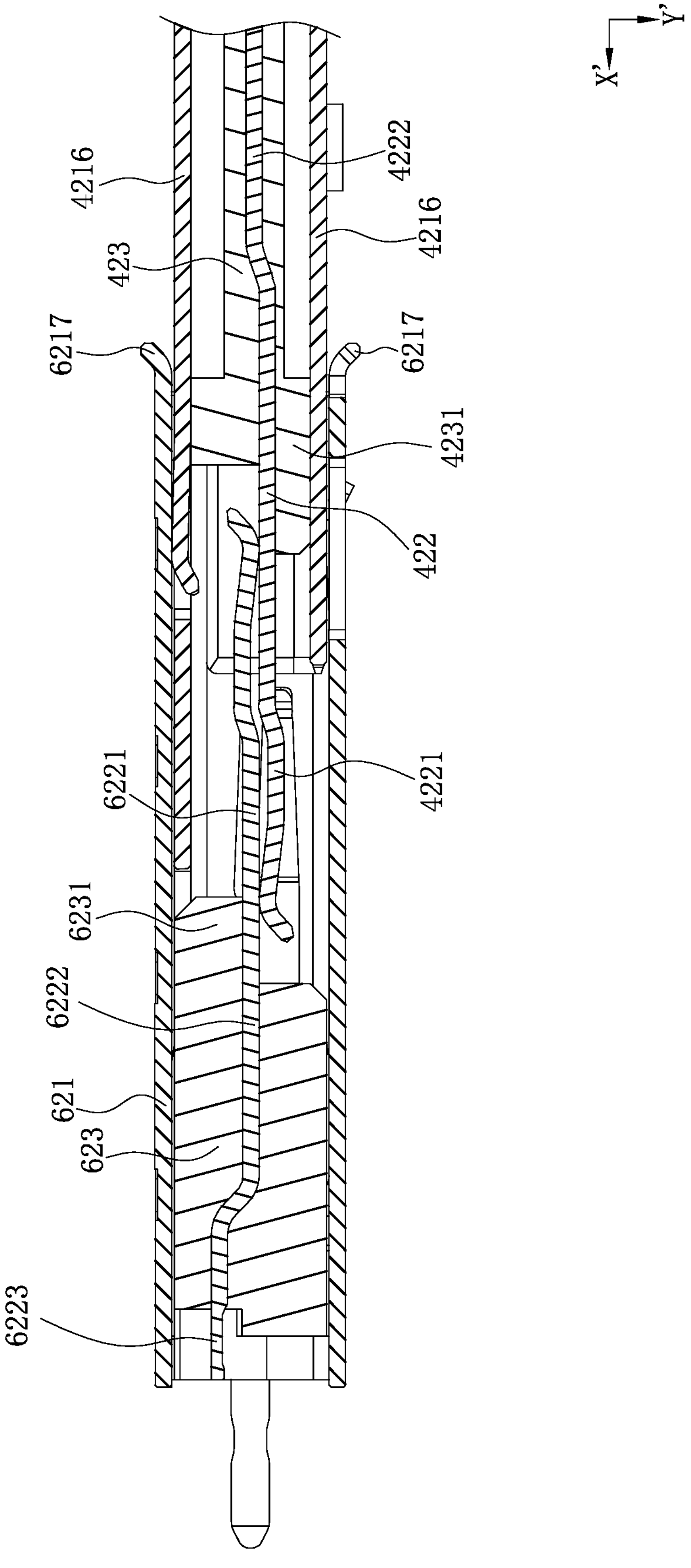
FIG. 23 is a partial sectional plain view of a first terminal assembly and a second terminal assembly after completion of mating according to the fourth embodiment of the present invention.

When the mating of the first connector 2 and the mating connector 6 is complete, each first terminal assembly 42 and a corresponding second terminal assembly 62 is mated with each other. As shown in FIG. 22 to FIG. 23, the first contact portion 4221 and the second contact portion 6221 are in contact with each other. The first supporting portion 4231 supports the first contact portion 4221 toward the second contact portion 6221, thereby providing a supporting force for the first contact portion 4221. The second supporting portion 6231 supports the second contact portion 6221 toward the first contact portion 4221, thereby providing a supporting force for the second contact portion 6221. The second supporting portion 6231 enters the reserved slot 4217. Thus, the reserved slot 4217 may prevent the first shielding shell 421 and the second supporting portion 6231 from colliding with each other. Further, compared to the case where the first shielding shell 421 is enlarged to avoid from colliding with the second supporting portion 6231, in this embodiment, by the reserved slot 4217, the size of the first shielding shell 421 may be reduced, thereby reducing the size of the electrical connector 2. It should be noted that the first embodiment and the fourth embodiment have similar structural features and corresponding effects, which are not hereinafter further elaborated.

In sum, the electrical connecting assembly 1 according to certain embodiments of the present invention has the following beneficial effects:

1. The first contact portion 4221 is exposed in the naked spacing region 4211, or the second contact portion 6221 is exposed in the naked spacing region 4211, or the first contact portion 4221 and the second contact portion 6221 are both exposed in the corresponding naked spacing region 4211, such that the first contact portion 4221 or the second contact portion 6221 is not in contact with the first shielding shell 421 in an abutting direction thereof, thus preventing the first contact portion 4221 or the second contact portion 6221 from being in contact with the first shielding shell 421 and short-circuiting. Meanwhile, the second shielding shell 621 shields the naked spacing region 4211, which further prevents the naked spacing region 4211 from causing the first contact portion 4221 or the second contact portion 6221 being affected by interference signals of the outer environment. Moreover, the first shielding shell 421 covers the outer side of the first signal terminals 422, thus shielding the interference signals from the first signal terminals 422, and enhancing the high frequency characteristics of the electrical connector 2. The second shielding shell 621 covers the outer side of the second signal terminals 622, thus shielding the interference signals from the second signal terminals 622, and enhancing the high frequency characteristics of the mating connector 6. Further, when mating of the electrical connector 2 and the mating connector 6 is complete, the second shielding shell 621 covers outside the first shielding shell 421 and shields the naked spacing region 4211, thereby allowing the first shielding shell 421 and the second shielding shell 621 to altogether shield the interference signals from the electrical connecting assembly 1, thus enhancing the high frequency characteristics of the electrical connecting assembly 1.
2. In certain embodiments of the present invention, by the guiding functions of the first guiding section 42215 and the second guiding section 62215, the first signal terminal 422 and the second signal terminal 622 are smoothly mated and in contact. Further, since the first guiding section 42215 bends and extends toward the first main body surface 4212 of the first shielding shell 421, and the second guiding section 62215 bends and extends toward the second main body surface 4213 of the first shielding shell 421, if there is no naked spacing region provided, the first guiding section 42215 and the second guiding section 62215 may be more easily in contact with the first shielding shell 421. Moreover, according to the certain embodiments of present invention, the first guiding section 42215 is exposed in the naked spacing region 4211 of the first shielding shell 421, or the second guiding section 62215 is exposed in the naked spacing region 4211 of the first shielding shell 421, or the first guiding section 42215 and the second guiding section 62215 are both exposed in the naked spacing region 4211 of the first shielding shell 421, which may prevent the first guiding section 42215 and the second guiding section 62215 from being in contact with the first shielding shell 421 and causing short-circuiting of the first signal terminal 422 or the second signal terminal 622. Meanwhile, on the premise that the first guiding section 42215 and the second guiding section 62215 are not in contact with the second shielding shell 621, the length design ranges of the first guiding section 42215 and the second guiding section 62215 are broader, thus facilitating increasing the length of the first guiding section 42215 and the second guiding section 62215 according to the actual need, and enlarging the designable ranges of the lengths of the first guiding section 42215 and the second guiding section 62215.

3. The first guiding section 42215 of the first contact portion 4221 passes forward beyond the first shielding shell 421, and the second guiding section 62215 is exposed in the naked spacing region 4211 and is shielded by the second shielding shell 621, thus preventing the first signal terminal 422 and the second signal terminal 622 from being in contact with the first shielding shell 421 and short-circuiting, reducing one naked spacing region 4211, reducing the manufacturing steps, and facilitating enhancing the production efficiency of the electrical connector 2.
4. Each elastic sheet 6215 of each second side surface 6213 abuts a corresponding first side surface 4214 inward, and each first side surface 4214 shields the corresponding opening 6214, thus allowing the first shielding shell 421 and the second shielding shell 621 to be in stable contact, and preventing the openings 6214 from allowing the first signal terminal 422 and the second signal terminal 622 to be interfered by outer signals.
5. The slot 42141 is provided between the first side surface 4214 and a corresponding curve transitional surface 4215 at a same side, the front end of each first side surface 4214 extends toward the naked spacing region 4211 beyond the connecting location of the corresponding curve transitional surface 4215 and the first side surface 4214, and the front end of each first side surface 4214 shields the corresponding opening 6214, thus increasing the contact area of each first side surface 4214 and the corresponding second side surface 6213, and facilitating each first side surface 4214 to better shield the corresponding opening 6214.
6. The first contact portion 4221 and the second contact portion 6221 respectively bend toward directions away from each other, thus allowing the first contact portion 4221 and the second contact portion 6221 to be further away from the first shielding shell 421 and the second shielding shell 621, further preventing the first signal terminal 422 and the second signal terminal 622 from being in contact with the first shielding shell 421 and short-circuiting. Further, the first contact portion 4221 and the second contact portion 6221 both bend twice, thus facilitating two-point contact, reducing open stub effect, and preventing the first contact portion 4221 and the second contact portion 6221 from colliding with each other in the mating process.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An electrical connecting assembly, comprising:

an electrical connector, comprising at least one first terminal assembly, wherein the first terminal assembly comprises: a pair of first signal terminals and a first shielding shell covering outside the pair of first signal terminals, the first shielding shell and the first signal terminals are electrically separated, and each of the first signal terminals has a first contact portion; and a mating connector, comprising at least one second terminal assembly, wherein the second terminal assembly comprises: a pair of second signal terminals and a second shielding shell covering outside the pair of second signal terminals, the second shielding shell and the second signal terminals are electrically separated, and each of the second signal terminals has a second contact portion;

wherein the first shielding shell is provided with at least one naked spacing region, and when mating of the electrical connector and the mating connector is complete, the second shielding shell covers outside the first shielding shell and shields the at least one naked spacing region, the first contact portion of each of the first signal terminals and the second contact portion of a corresponding one of the second signal terminals are mated, and at least one of the first contact portion of each of the first signal terminals and the second contact portion of each of the second signal terminals is exposed in the at least one naked spacing region;

wherein each of the first shielding shell and the second shielding shell is formed in a tube-shaped structure, the first shielding shell further comprises at least one main body surface, and the at least one naked spacing region is formed by being backward concavely provided from a front end of the main body surface.

2. The electrical connecting assembly according to claim 1, wherein a tail end of at least one of the first contact portion of each of the first signal terminals and the second contact portion of each of the second signal terminals has a guiding section bending and extending, and the guiding section is exposed in the at least one naked spacing region.

3. The electrical connecting assembly according to claim 1, wherein each of the first contact portion of each of the first signal terminals and the second contact portion of each of the second signal terminals has a first contact section and a second contact section, the second contact section of the first contact portion is located adjacent to a tail end of the first contact portion relative to the first contact section of the first contact portion, the second contact section of the second contact portion is located adjacent to a tail end of the second contact portion relative to the first contact section of the second contact portion, each of the first contact portion and the second contact portion has a guiding section formed by bending and extending from the second contact section thereof, and the guiding section of the first contact portion passes forward beyond the first shielding shell, wherein when mating of the electrical connector and the mating connector is complete, the second contact section of the second contact portion of the corresponding one of the second signal terminals is in contact with the first contact section of the first contact portion of each of the first signal terminals, and the guiding section of the second contact portion is exposed in the at least one naked spacing region and shielded by the second shielding shell.

4. The electrical connecting assembly according to claim 1, wherein the first shielding shell has two first side surfaces provided oppositely, the second shielding shell has two second side surfaces provided oppositely, each of the second side surfaces is provided with an opening, an elastic sheet is formed by integrally extending from an inner edge of the opening of each of the second side surfaces, and when mating of the electrical connector and the mating connector is complete, the elastic sheet corresponding to each of the second side surfaces abuts a corresponding one of the first side surfaces, and each of the first side surfaces shields the opening of a corresponding one of the second side surfaces.

5. An electrical connecting assembly, comprising:

an electrical connector, comprising at least one first terminal assembly, wherein the first terminal assembly comprises: a pair of first signal terminals and a first shielding shell covering outside the pair of first signal terminals, the first shielding shell and the first signal terminals are electrically separated, and each of the first signal terminals has a first contact portion; and a mating connector, comprising at least one second terminal assembly, wherein the second terminal assembly comprises: a pair of second signal terminals and a second shielding shell covering outside the pair of second signal terminals, the second shielding shell and the second signal terminals are electrically separated, and each of the second signal terminals has a second contact portion;

wherein the first shielding shell is provided with at least one naked spacing region, and when mating of the electrical connector and the mating connector is complete, the second shielding shell covers outside the first shielding shell and shields the at least one naked spacing region, the first contact portion of each of the first signal terminals and the second contact portion of a corresponding one of the second signal terminals are mated, and at least one of the first contact portion of each of the first signal terminals and the second contact portion of each of the second signal terminals is exposed in the at least one naked spacing region;

wherein the first shielding shell has two first side surfaces provided oppositely. the second shielding shell has two second side surfaces provided oppositely, and each of the second side surfaces is provided with an opening;

wherein the first shielding shell further comprises at least one main body surface, each of two sides of the main body surface is connected to a corresponding one of the first side surfaces through a curved transitional surface, the at least one naked spacing region is formed by being backward concavely provided from a front end of the main body surface, each of the first side surface is provided with a recess in communication with the at least one naked spacing region, the recess is provided between the corresponding one of the first side surfaces and the curved transitional surface on a same side of the two sides, a front end of each of the first side surfaces extends in a direction toward the at least one naked spacing region beyond a connecting location of the curved transitional surface and the corresponding one of the first side surfaces, and the front end of each of the first side surfaces shields the opening of the corresponding one of the second side surfaces.

6. The electrical connecting assembly according to claim 5, wherein each of the first signal terminals has a first conductive portion and a first connecting portion connecting the first contact portion and the first conductive portion, and the first contact portion extends forward from the first connecting portion and bends toward a direction away from the second contact portion.

7. The electrical connecting assembly according to claim 6, wherein each of the second signal terminals has a second conductive portion and a second connecting portion connecting the second contact portion and the second conductive portion, and the second contact portion extends toward an extending direction of each of the second signal terminals and bends toward a direction away from the first contact portion.

8. The electrical connecting assembly according to claim 7, wherein each of the first contact portion of each of the first signal terminals and the second contact portion of each of the second signal terminals has a first bending section, a first contact section, a second bending section and a second contact section formed by sequentially extending along respective extending directions, the first bending section and the second bending section of the first contact portion both bend toward the direction away from the second contact portion, and the first bending section and the second bending section of the second contact portion both bend toward the direction away from the first contact portion; and when mating of the electrical connector and the mating connector is complete, the second contact section of the first contact portion of each of the first signal terminals is in contact with the first contact section of the second contact portion of the corresponding one of the second signal terminals, and the second contact section of the second contact portion of the corresponding one of the second signal terminals is in contact with the first contact section of the first contact portion of each of the first signal terminals.

9. The electrical connecting assembly according to claim 8, wherein:

the first terminal assembly further has a first insulating block insulating and separating the first signal terminals from the first shielding shell, the first insulating block has at least one first supporting portion extending forward beyond the first bending section of the first contact portion, and the at least one first supporting portion is located at an opposite side of a contact surface of the first contact section of the first contact portion of each of the first signal terminals and supports the first contact portion of each of the first signal terminals; and the second terminal assembly further has a second insulating block insulating and separating the second signal terminals from the second shielding shell, the second insulating block has at least one second supporting portion extending toward the electrical connector beyond the first bending section of the second contact portion, and the at least one second supporting portion is located at an opposite side of a contact surface of the first contact section of the second contact portion of each of the second signal terminals and supports the second contact portion of each of the second signal terminals.

10. The electrical connecting assembly according to claim 5, wherein the first contact portion of each of the first signal terminals is exposed in the at least one naked spacing region, and the first shielding shell is further provided with a reserved slot provided opposite to the at least one naked spacing region; and the second terminal assembly further has an insulating block insulating and separating the second signal terminals from the second shielding shell, the insulating block has at least one supporting portion, and when mating of the electrical connector and the mating connector is complete, the at least one supporting portion supports the second contact portion of each of the second signal terminals toward the first contact portion of a corresponding one of the first signal terminals, and the reserved slot is reserved for the supporting portion.

11. The electrical connecting assembly according to claim 1, wherein each of the first signal terminals has a first conductive portion and a first connecting portion connecting the first contact portion and the first conductive portion, and the first contact portion extends forward from the first connecting portion and bends toward a direction away from the second contact portion.

12. The electrical connecting assembly according to claim 11, wherein each of the second signal terminals has a second conductive portion and a second connecting portion connecting the second contact portion and the second conductive portion, and the second contact portion extends toward an extending direction of each of the second signal terminals and bends toward a direction away from the first contact portion.

13. The electrical connecting assembly according to claim 12, wherein each of the first contact portion of each of the first signal terminals and the second contact portion of each of the second signal terminals has a first bending section, a first contact section, a second bending section and a second contact section formed by sequentially extending along respective extending directions, the first bending section and the second bending section of the first contact portion both bend toward the direction away from the second contact portion, and the first bending section and the second bending section of the second contact portion both bend toward the direction away from the first contact portion; and when mating of the electrical connector and the mating connector is complete, the second contact section of the first contact portion of each of the first signal terminals is in contact with the first contact section of the second contact portion of the corresponding one of the second signal terminals, and the second contact section of the second contact portion of the corresponding one of the second signal terminals is in contact with the first contact section of the first contact portion of each of the first signal terminals.

14. The electrical connecting assembly according to claim 13, wherein:

the first terminal assembly further has a first insulating block insulating and separating the first signal terminals from the first shielding shell, the first insulating block has at least one first supporting portion extending forward beyond the first bending section of the first contact portion, and the at least one first supporting portion is located at an opposite side of a contact surface of the first contact section of the first contact portion of each of the first signal terminals and supports the first contact portion of each of the first signal terminals; and the second terminal assembly further has a second insulating block insulating and separating the second signal terminals from the second shielding shell, the second insulating block has at least one second supporting portion extending toward the electrical connector beyond the first bending section of the second contact portion, and the at least one second supporting portion is located at an opposite side of a contact surface of the first contact section of the second contact portion of each of the second signal terminals and supports the second contact portion of each of the second signal terminals.

15. An electrical connecting assembly, comprising:

an electrical connector, comprising at least one first terminal assembly, wherein the first terminal assembly comprises: a pair of first signal terminals and a first shielding shell covering outside the pair of first signal terminals, the first shielding shell and the first signal terminals are electrically separated, and each of the first signal terminals has a first contact portion; and a mating connector, comprising at least one second terminal assembly, wherein the second terminal assembly comprises: a pair of second signal terminals and a second shielding shell covering outside the pair of second signal terminals, the second shielding shell and the second signal terminals are electrically separated, and each of the second signal terminals has a second contact portion;

wherein the first shielding shell is provided with at least one naked spacing region, and when mating of the electrical connector and the mating connector is complete, the second shielding shell covers outside the first shielding shell and shields the at least one naked spacing region, the first contact portion of each of the first signal terminals and the second contact portion of a corresponding one of the second signal terminals are mated, and at least one of the first contact portion of each of the first signal terminals and the second contact portion of each of the second signal terminals is exposed in the at least one naked spacing region;

wherein the first shielding shell comprises two U-shaped shielding bodies, the two U-shaped shielding bodies are assembled to each other to form a tube-shaped structure, the at least one naked spacing region is formed on one of the two U-shaped shielding bodies, the second shielding shell is formed in a tube-shaped structure, and when mating of the electrical connector and the mating connector is complete, the first shielding shell and the second shielding shell are mated to each other to completely cover the first contact portion of each of the first signal terminals and the second contact portion of each of the second signal terminals.

16. The electrical connecting assembly according to claim 15, wherein:

each of the first signal terminals has a first conductive portion and a first connecting portion connecting the first contact portion and the first conductive portion, and the first contact portion extends forward from the first connecting portion;

each of the second signal terminals has a second conductive portion and a second connecting portion connecting the second contact portion and the second conductive portion, and the second contact portion extends toward an extending direction of each of the second signal terminals;

each of the first contact portion of each of the first signal terminals and the second contact portion of each of the second signal terminals has a first bending section, a first contact section, a second bending section and a second contact section formed by sequentially extending along respective extending directions, the first bending section and the second bending section of the first contact portion both bend toward the direction away from the second contact portion, and the first bending section and the second bending section of the second contact portion both bend toward the direction away from the first contact portion; and when mating of the electrical connector and the mating connector is complete, the second contact section of the first contact portion of each of the first signal terminals is in contact with the first contact section of the second contact portion of the corresponding one of the second signal terminals, and the second contact section of the second contact portion of the corresponding one of the second signal terminals is in contact with the first contact section of the first contact portion of each of the first signal terminals.

17. The electrical connecting assembly according to claim 16, wherein:

the first terminal assembly further has a first insulating block insulating and separating the first signal terminals from the first shielding shell, the first insulating block has at least one first supporting portion extending forward beyond the first bending section of the first contact portion, and the at least one first supporting portion is located at an opposite side of a contact surface of the first contact section of the first contact portion of each of the first signal terminals and supports the first contact portion of each of the first signal terminals; and the second terminal assembly further has a second insulating block insulating and separating the second signal terminals from the second shielding shell, the second insulating block has at least one second supporting portion extending toward the electrical connector beyond the first bending section of the second contact portion, and the at least one second supporting portion is located at an opposite side of a contact surface of the first contact section of the second contact portion of each of the second signal terminals and supports the second contact portion of each of the second signal terminals.

18. The electrical connecting assembly according to claim 1, wherein the first contact portion of each of the first signal terminals is exposed in the at least one naked spacing region, and the first shielding shell is further provided with a reserved slot provided opposite to the at least one naked spacing region; and the second terminal assembly further has an insulating block insulating and separating the second signal terminals from the second shielding shell, the insulating block has at least one supporting portion, and when mating of the electrical connector and the mating connector is complete, the at least one supporting portion supports the second contact portion of each of the second signal terminals toward the first contact portion of a corresponding one of the first signal terminals, and the reserved slot is reserved for the supporting portion.

19. The electrical connecting assembly according to claim 1, wherein the electrical connector comprises at least one insulating body and a plurality of first terminal assemblies, the insulating body is provided with a plurality of accommodating slots concavely provided from two opposite sides of the insulating body, and each of the plurality of first terminal assemblies is accommodated in a corresponding one of the accommodating slots.

20. The electrical connecting assembly according to claim 1, wherein the electrical connector comprises two rows of first terminal assemblies, each row of the two rows of the first terminal assemblies comprises a plurality of the first terminal assemblies arranged along a vertical direction, the two rows of the first terminal assemblies are provided to be adjacent to each other along a left-right direction perpendicular to the vertical direction and to deviate from each other along the vertical direction, and in the two rows of the first terminal assemblies provided to be adjacent to each other, projections of the first signal terminals of one row of the two rows of the first terminal assemblies and projections of the first signal terminals of the other row of the two rows of the first terminal assemblies along the left-right direction are completely staggered.

* * * * *